(12) United States Patent
Leung et al.

(10) Patent No.: US 8,363,893 B2
(45) Date of Patent: Jan. 29, 2013

(54) OBJECT DETECTION CONTROL APPARATUS, OBJECT DETECTING SYSTEM, OBJECT DETECTION CONTROL METHOD, AND COMPUTER PROGRAM

(75) Inventors: Andrew Leung, Kanagawa (JP); Yukihiro Sakamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 849 days.

(21) Appl. No.: 12/490,446

(22) Filed: Jun. 24, 2009

(65) Prior Publication Data

US 2009/0324085 A1 Dec. 31, 2009

(30) Foreign Application Priority Data

Jun. 27, 2008 (JP) ................ P2008-169251

(51) Int. Cl.
*G06K 9/00* (2006.01)
(52) U.S. Cl. ............. 382/103; 700/4; 709/201; 718/105
(58) Field of Classification Search .................. 382/103; 700/4; 709/201; 718/105
See application file for complete search history.

(56) References Cited

U.S. PATENT DOCUMENTS

| | | | |
|---|---|---|---|
| 6,298,170 B1 * | 10/2001 | Morita et al. ............ | 382/278 |
| 7,106,895 B1 * | 9/2006 | Goldberg et al. ......... | 382/144 |
| 8,056,086 B2 * | 11/2011 | El-Mahdy et al. ........ | 718/105 |
| 2006/0221087 A1 * | 10/2006 | Diard ...................... | 345/505 |
| 2007/0074207 A1 | 3/2007 | Bates et al. | |
| 2007/0201747 A1 | 8/2007 | Yamada et al. | |

FOREIGN PATENT DOCUMENTS

| | | |
|---|---|---|
| JP | 2001-092798 | 4/2001 |
| JP | 2002-544602 A | 12/2002 |
| JP | 2005-274172 A | 10/2005 |
| JP | 2006-331207 | 12/2006 |
| JP | 2007-265390 | 10/2007 |

OTHER PUBLICATIONS

Wojek et al. : "Sliding-Windows for Rapid Object Class Localization: A Parallel Technique", Pattern Recognition; Lecture Notes in Computer Science, Jun. 10, 2008, pp. 71-81, vol. 5096, Springer Berlin Heidelberg, Berlin, Heidelberg, Germany.

Sen et al.: "Modeling Image Processing Systems with Homogeneous Parameterized Dataflow Graphs" 2005 IEEE International Conference on Acoustics, Speech, and Signal Processing, Mar. 18, 2005, pp. 133-136, vol. 5, IEEE, Piscataway, New Jersey, USA.

Hiramatsu et al.: "Implementation of fast object detection on cell based systems", Contribution to IBM Cell BE Contest 2007, Sep. 30, 2007, pp. 1-2.

(Continued)

*Primary Examiner* — Chan S Park
*Assistant Examiner* — Katrina Fujita
(74) *Attorney, Agent, or Firm* — Wolf, Greenfield & Sacks, P.C.

(57) ABSTRACT

An object detection control apparatus includes: a detection processing allocating unit that allocates object detection processing to any one of plural object detecting units that perform the detection processing on the basis of a transfer image area; a size generating unit that generates size of the transfer image area according to a detection area for the object detecting-unit to which the detection processing is allocated; and a reference-position generating unit that generates a position serving as a reference for the transfer image area using the generated size of the transfer image area and a position serving as a reference for the detection area moved by a predetermined number of pixels at a time.

16 Claims, 21 Drawing Sheets

OTHER PUBLICATIONS

Anonymous: "The Cell/B.E. Challenge '07: Beyond Gaming" IBM Student Portal:Cell BE Contest 07 Jul. 28, 2009, pp. 1-4, Internet Citation: http://www-304.ibm.com/jct01005c/university/students/cotests/cell/index.html.

Hiromoto et al.: "A Specialized Processor Suitable for Adaboost-Based Detection with Haar-like Features", IEEE Conference on Computer Vision and Pattern Recognition 2007, Jun. 1, 2007, pp. 1-8, IEEE, Piscataway, New Jersey, USA.

\* cited by examiner

FIG.10A
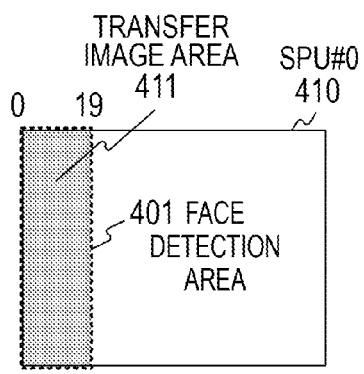
TRANSFER IMAGE AREA 411   SPU#0 410
0  19
401 FACE DETECTION AREA

FIG.10B
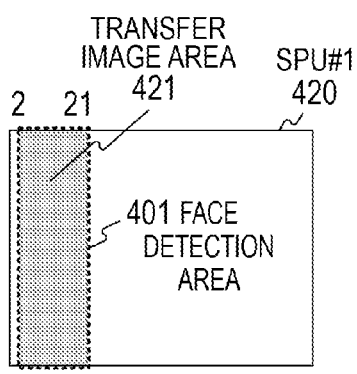
TRANSFER IMAGE AREA 421   SPU#1 420
2  21
401 FACE DETECTION AREA

FIG.10C
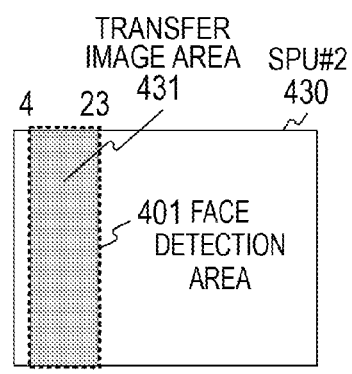
TRANSFER IMAGE AREA 431   SPU#2 430
4  23
401 FACE DETECTION AREA

FIG.10D
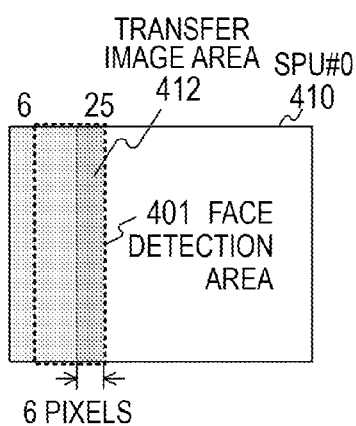
TRANSFER IMAGE AREA 412   SPU#0 410
6  25
401 FACE DETECTION AREA
6 PIXELS

FIG.10E
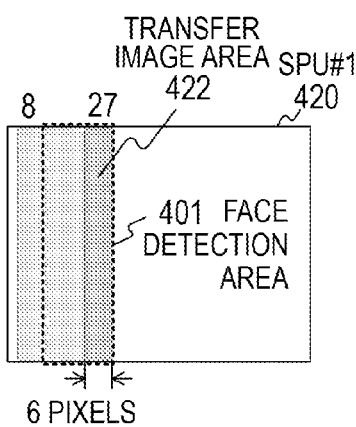
TRANSFER IMAGE AREA 422   SPU#1 420
8  27
401 FACE DETECTION AREA
6 PIXELS

FIG.10F
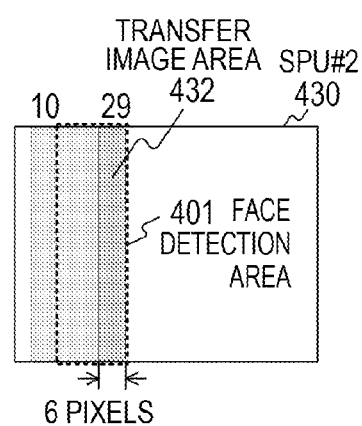
TRANSFER IMAGE AREA 432   SPU#2 430
10  29
401 FACE DETECTION AREA
6 PIXELS

FIG.10H
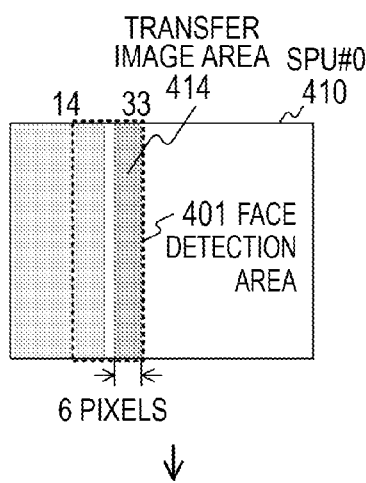
TRANSFER IMAGE AREA 414   SPU#0 410
14  33
401 FACE DETECTION AREA
6 PIXELS

FIG.10G
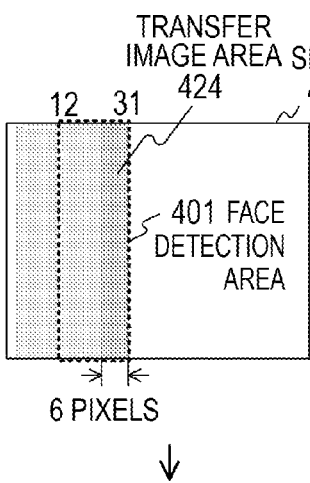
TRANSFER IMAGE AREA 424   SPU#1 420
12  31
401 FACE DETECTION AREA
6 PIXELS

FIG.10I
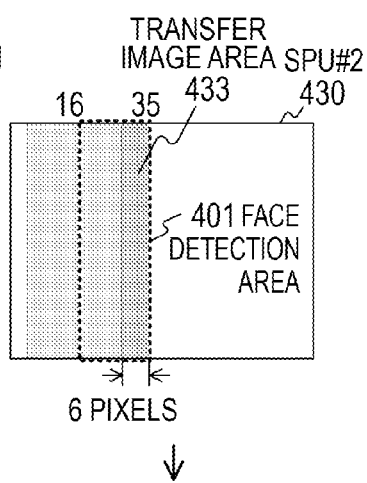
TRANSFER IMAGE AREA 433   SPU#2 430
16  35
401 FACE DETECTION AREA
6 PIXELS

FIG.12A
TRANSFER IMAGE AREA 411  SPU#0 410
0  19
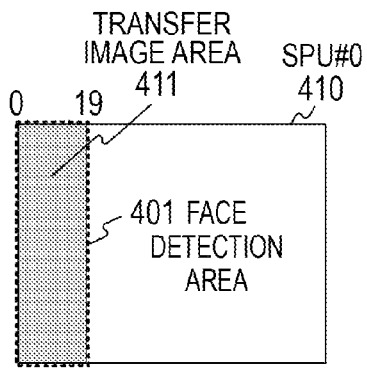
401 FACE DETECTION AREA

FIG.12B
TRANSFER IMAGE AREA 421  SPU#1 420
2  21
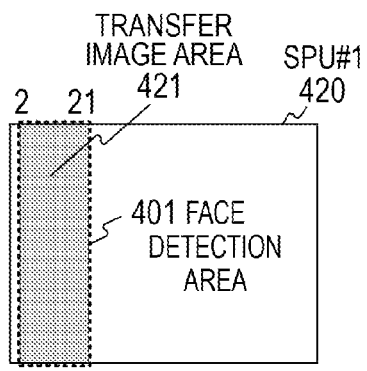
401 FACE DETECTION AREA

FIG.12C
TRANSFER IMAGE AREA 431  SPU#2 430
4  23
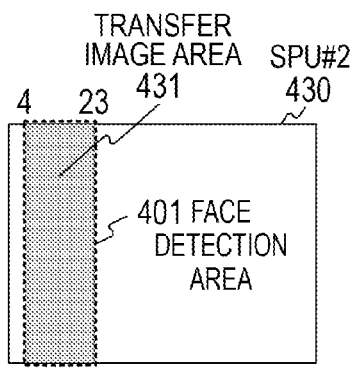
401 FACE DETECTION AREA

  

FIG.12D
TRANSFER IMAGE AREA 512  SPU#0 410
6  25
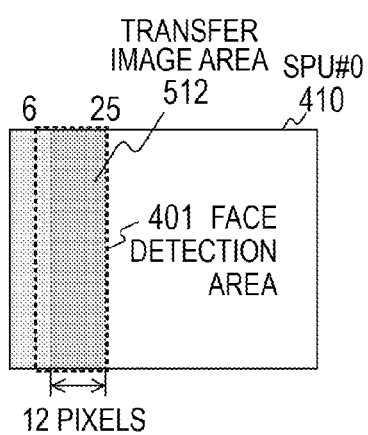
401 FACE DETECTION AREA
12 PIXELS

FIG.12E
TRANSFER IMAGE AREA 522  SPU#1 420
8  27
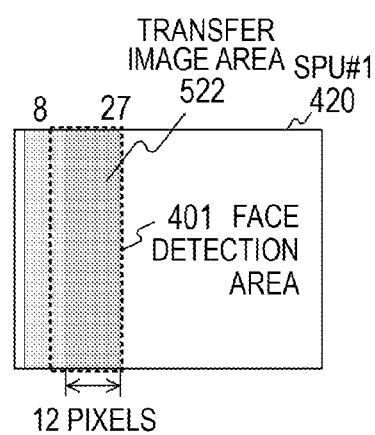
401 FACE DETECTION AREA
12 PIXELS

FIG.12F
TRANSFER IMAGE AREA 532  SPU#2 430
10  29
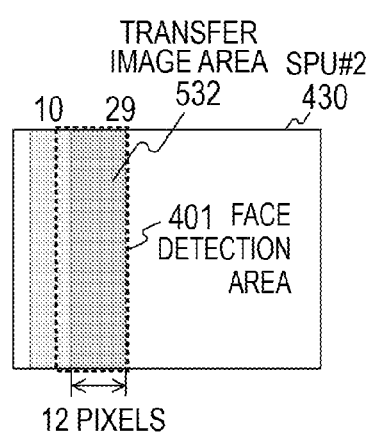
401 FACE DETECTION AREA
12 PIXELS

  

FIG.12H
TRANSFER IMAGE AREA 514  SPU#0 410
14  33
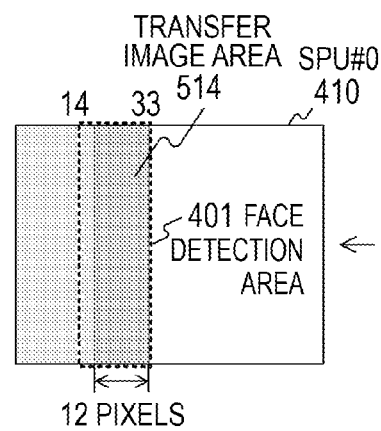
401 FACE DETECTION AREA
12 PIXELS

FIG.12G
TRANSFER IMAGE AREA 524  SPU#1 420
12  31
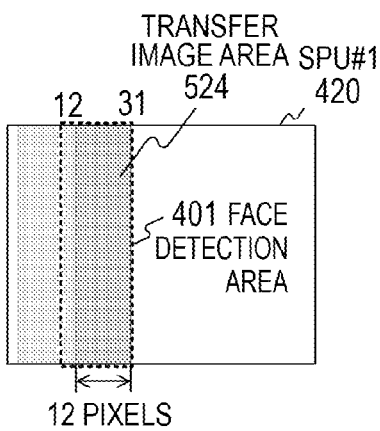
401 FACE DETECTION AREA
12 PIXELS

FIG.12I
TRANSFER IMAGE AREA 533  SPU#2 430
16  35
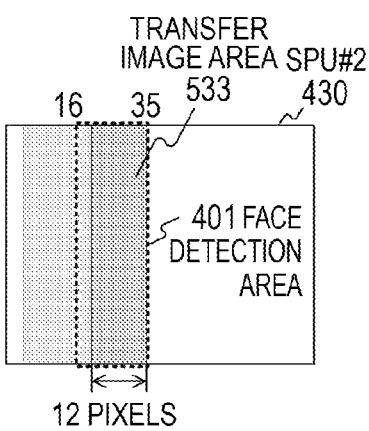
401 FACE DETECTION AREA
12 PIXELS

  

FIG. 15

| COUNTER \ PROCESSING SEQUENCE ORDER | 651 | 652 | 653 | 654 | 655 | 656 | 657 | 658 | 659 |
|---|---|---|---|---|---|---|---|---|---|
|  | 1 | 2 | 3 | 4 | 5 | 6 | 7 | 8 | 9 |
| n_SPU#0 — 641 | 0 | 1 | 2 | 0 | 1 | 2 | 3 | 0 | 1 |
| n_SPU#1 — 642 | 1 | 0 | 1 | 2 | 0 | 1 | 0 | 1 | 2 |
| n_SPU#2 — 643 | 1 | 2 | 0 | 1 | 2 | 0 | 1 | 2 | 0 |

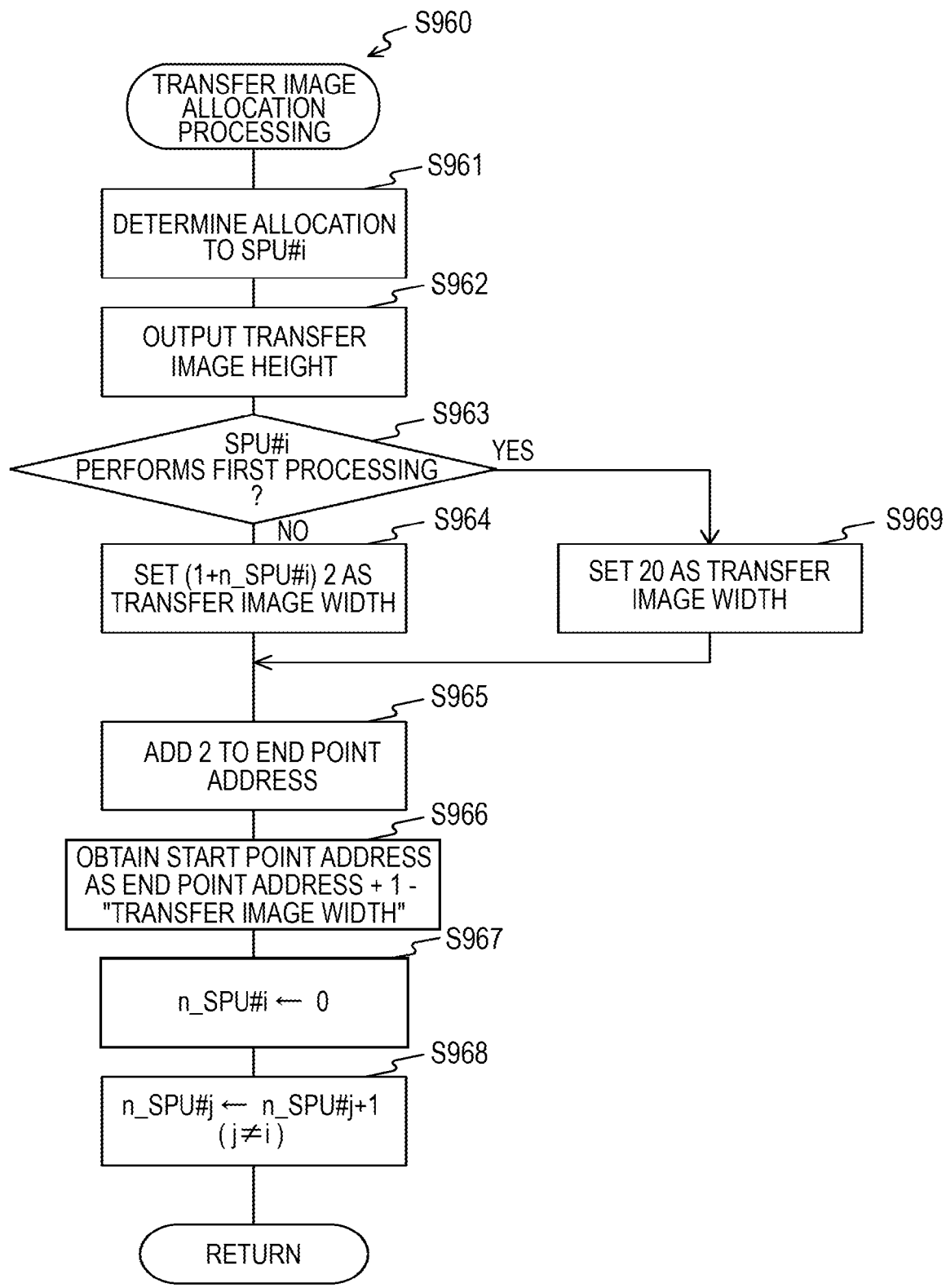

FIG.21A
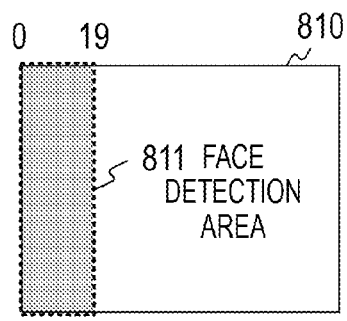
FIG.21B
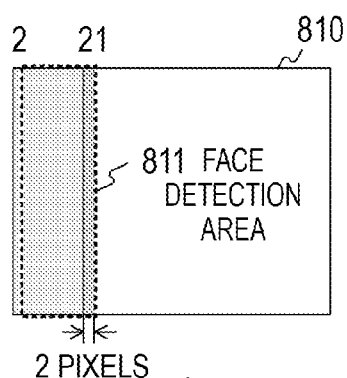
FIG.21C
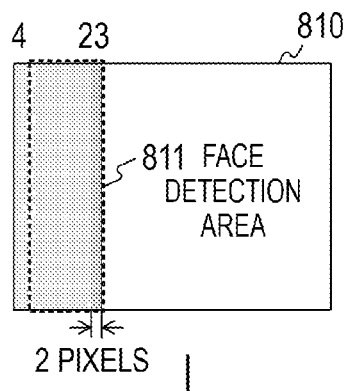

OBJECT DETECTION CONTROL APPARATUS, OBJECT DETECTING SYSTEM, OBJECT DETECTION CONTROL METHOD, AND COMPUTER PROGRAM

CROSS REFERENCE TO RELATED APPLICATIONS

The present application claims priority under 35 U.S.C. §119 to Japanese Patent Application JP 2008-169251, filed in the Japan Patent Office on Jun. 27, 2008, which is incorporated by reference herein in its entirety.

BACKGROUND OF THE INVENTION

1. Field of the Invention

The present invention relates to an object detection control apparatus, and, more particularly to an object detection control apparatus, an object detecting system, and a control method therefor for detecting an object in an image with parallel processing and a computer program for causing a computer to execute the method.

2. Description of the Related Art

In the past, as a method of detecting an object such as a face included in an input image, for example, there is known a template matching method for collating plural reduced images hierarchically generated with respect to the input image and a template image of the object to specify the object. In the template matching method, it is a general practice to perform object detection processing while scanning the template image from the left to right in the horizontal direction with respect to the input image and the plural reduced images. However, in this method, correlation values and differential root sum values are often used and processing for using the values takes time. Therefore, for example, there is proposed a method of reducing the number of hierarchically-generated reduced images to improve the speed of face detection processing (see, for example, JP-A-2007-265390). A generally-used method for face detection processing is briefly explained with reference to drawings.

FIGS. 20A to 20C are schematic diagrams of the method for face detection processing. In FIGS. 20A to 20C, an input image 810 and reduced images 820 and 830, which are face detection targets, and face detection areas 811, 821 and 831 are shown. In order to detect faces of different sizes included in the input image 810, the size of a template image is fixed and the reduced images 820 and 830 obtained by hierarchically reducing the size of the input image are generated to perform the face detection processing. A reduction ratio for generating reduced images is set to 0.7. The face detection areas 811, 821, and 831 are areas in which the face detection processing is performed. The width of the face detection areas 811, 821, and 831 is set to 20 pixels and the height thereof is set to the height of the detection target input image 810 or reduced images 820 to 830.

In FIG. 20A, the face detection processing is performed while the face detection area 811 having the size of 960 pixels in height and 20 pixels in width is moved from the left to right with respect to the input image 810 having the size of 960 pixels in height and 1280 pixels in width. In this case, after the template image is moved from up to down in the face detection area 811, the face detection area 811 is moved in the right direction. When the face detection processing for the input image 810 is finished, as shown in FIG. 20B, the reduced image 820 obtained by multiplying the height and the width of the input image 810 by 0.7 is generated and the face detection processing is performed while the face detection area 821 is moved from the left to right as explained above. The width of the face detection area 821 is 20 pixels and is the same as the width of the face detection area 811. However, the height of the face detection area 821 is set to the height of the reduced image 820. When the face detection processing for the reduced image 820 is finished, the reduced image 820 is further reduced according to a reduction ratio. Finally, the processing is repeated until the reduced image 820 is reduced to the size of the reduced image 830 shown in FIG. 20C. Transition of the face detection area moved from the left to right is briefly explained below.

FIGS. 21A to 21C are schematic diagrams of a method of the face detection processing for the input image 810. In FIGS. 21A to 21C, an example of transition of the face detection area 811 with respect to the input image 810 is shown. In FIG. 21A, zeroth to nineteenth rows of the input image 810 are allocated as the face detection area 811. When the face detection processing in this position is finished, as shown in FIG. 21B, the face detection area 811 (second to twenty-first rows of the input image 810) formed by moving the face detection area 811 in the right direction by two pixels is allocated anew and the face detection processing is performed. Subsequently, as shown in FIG. 21C, the face detection area 811 is further moved in the right direction by two pixels and the face detection processing is performed. The same processing is repeated to the right end of the input image 810.

In this way, the reduced image areas are hierarchically generated and the face detection area is scanned from the left to right in the horizontal direction with respect to the reduced images to perform the face detection processing. In general, such face detection processing is executed by one processor.

SUMMARY OF THE INVENTION

In the related art explained above, processing speed is improved by reducing the number of reduced images in the object detection processing. However, the speed of the object detection processing depends on processing ability of one processor included in the detection processing apparatus. Therefore, it is difficult to realize further improvement of speed.

Therefore, it is desirable to improve the processing speed of the object detection processing.

According to an embodiment of the present invention, there is provided an object detection control apparatus including: a detection processing allocating unit that allocates object detection processing to any one of plural object detecting units that perform the detection processing on the basis of a transfer image area; a size generating unit that generates the size of the transfer image area according to a detection area for the object detecting unit to which the detection processing is allocated; and a reference-position generating unit that generates a position serving as a reference for the transfer image area using the generated size of the transfer image area and a position serving as a reference for the detection area moved by a predetermined number of pixels at a time. There is also provided a processing method for the object detection control apparatus and a computer program for causing a computer to execute the method. Consequently, there is an action of allocating the detection processing to any one of the plural object detecting units and causing the size generating unit to generate the size of the transfer image area corresponding to the detection area of the object detecting unit.

Preferably, the size generating unit generates the size of the transfer image area on the basis of the number of times the detection-processing allocating unit allocates the detection processing to the other object detecting units in a period from the time when the object detecting unit, to which the detection processing is allocated, is allocated with the detection processing in the past until the object detecting unit is allocated with the detection processing anew. Consequently, there is an action of causing the size generating unit to generate the size of the transfer image area on the basis of the number of times the detection processing is allocated to the other object detecting units. In this case, preferably, the size generating unit uses, as the number of times the detection processing is allocated, a numerical value calculated on the basis of the number of the plural object detecting units and the predetermined number of pixels. Consequently, there is an action of causing the size generating unit to generate the size of the transfer image area on the basis of the number of object detecting units and the predetermined number of pixels.

Preferably, when the size generating unit generates the size of the transfer image area on the basis of the number of times the detection-processing allocating unit allocates the detection processing to the other object detecting units in a period from the time when the object detecting unit, to which the detection processing is allocated, is allocated with the detection processing in the past until the object detecting unit is allocated with the detection processing anew, the size generating unit uses, as the number of times the detection processing is allocated, an estimated value estimated in advance. Consequently, there is an action of causing the size generating unit to generate the size of the transfer image area using the estimated value estimated in advance.

Preferably, when the size generating unit generates the size of the transfer image area on the basis of the number of times the detection-processing allocating unit allocates the detection processing to the other object detecting units in a period from the time when the object detecting unit, to which the detection processing is allocated, is allocated with the detection processing in the past until the object detecting unit is allocated with the detection processing anew, the size generating unit includes: plural counters corresponding to the respective plural object detecting units; a selector that outputs, when the detection processing is allocated to one object detecting unit by the detection-processing allocating unit, a counter value in the counter corresponding to the one object detecting unit, to which the detection processing is allocated, among the plural counters; a counter control unit that sets, when the detection processing is allocated to the one object detecting unit by the detection-processing allocating unit, the counter corresponding to the one object detecting unit, to which the detection processing is allocated, to an initial value and increments the other counters by a fixed number; and a transfer-image-size calculating unit that outputs, as the size of the transfer image area, a numerical value calculated on the basis of the counter value output from the selector and the predetermined number of pixels. Consequently, there is an action of causing the size generating unit to generate the size of the transfer image area on the basis of the number of times the detection processing is allocated to the other object detecting units.

Preferably, the detection-processing allocating unit allocates the next detection processing to the object detecting unit, to which the detection processing is allocated, when end notification of the detection processing is received from the object detecting unit. Consequently, there is an action of reducing waiting time of the object detecting unit that finishes the detection processing.

Preferably, the detection-processing allocating unit allocates the detection processing to the plural object detecting unit in order. Consequently, there is an action of fixing the size of the transfer image area.

According to another embodiment of the present invention, there is provided an object detecting system including: plural object-detection processing apparatuses that perform object detection processing on the basis of a transfer image area; and an object-detection control apparatus including a detection-processing allocating unit that allocates the detection processing to any one of the plural object-detection processing apparatuses, a size generating unit that generates the size of the transfer image area according to a detection area for the object detecting unit to which the detection processing is allocated, and a reference-position calculating unit that calculates a position serving as a reference of the transfer image area using the generated size of the transfer image area and a position serving as a reference of the detection area moved by a predetermined number of pixels at a time. Consequently, there is an action of allocating the detection processing to any one of the plural object detecting apparatuses and causing the size generating unit to generate the size of the transfer image area corresponding to the detection area of the object detecting apparatus.

According to the embodiments of the present invention, it is possible to realize an excellent effect that processing speed can be improved by performing object detection processing using plural processors.

BRIEF DESCRIPTION OF THE DRAWINGS

FIGS. 10A to 10I are conceptual diagrams of a face detection processing example to which asynchronous allocation shown in FIG. 8B is applied;

FIGS. 12A to 12I are conceptual diagrams of a processing method in the second example of the face detecting apparatus 100 according to the embodiment;

FIG. 15 is a diagram of a transition example of a counter value of the transfer-image allocating unit 300 in the third example of the face detecting apparatus 100 according to the embodiment;

FIG. 18 is a flowchart of a processing procedure example of transfer image allocation processing (step S960) of the control processor 200 in the third example of the face detecting apparatus 100 according to the embodiment;

FIGS. 21A to 21C are schematic diagrams of a method of face detection processing for an input image 810.

DESCRIPTION OF THE PREFERRED EMBODIMENTS

Embodiments of the present invention are explained in detail below with reference to the accompanying drawings.

Figure 1:
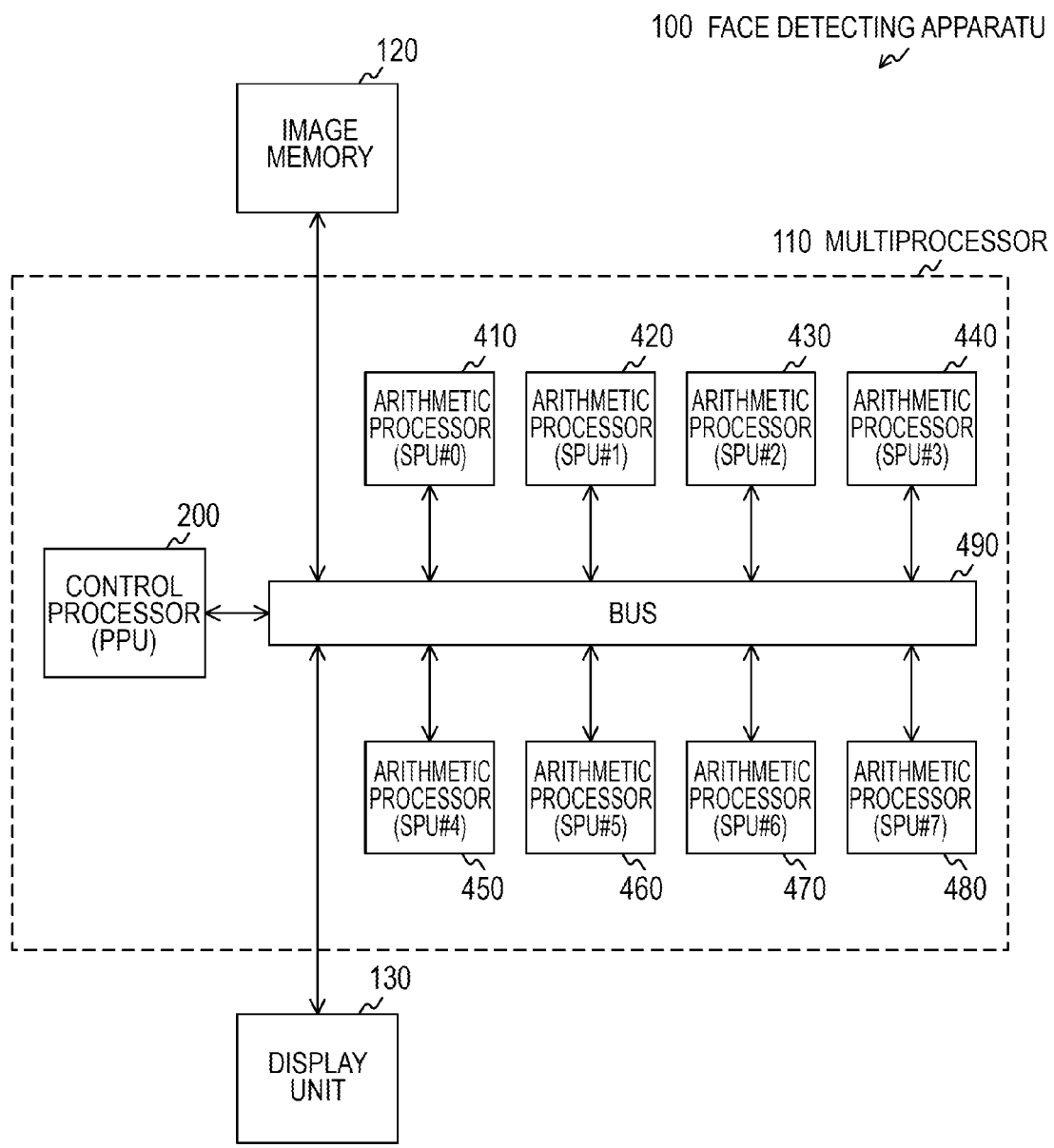
FIG. 1 is a block diagram of a face detecting apparatus according to an embodiment of the present invention.

FIG. 1 is a block diagram of a face detecting apparatus according to an embodiment of the present invention. A face detecting apparatus 100 includes a multiprocessor 110, an image memory 120, and a display unit 130.

The multiprocessor 110 performs control of the entire apparatus and allocation of tasks. The multiprocessor 110 is a processor in which different two kinds of plural processors are mounted on one CPU (Central Processing Unit) package. The different two kinds of processors are referred to as a control processor (PPU: PowerPC Processor Unit) and an arithmetic processor (SPU: Synergistic Processor Unit).

The multiprocessor 110 includes a control processor (PPU) 200, arithmetic processors (SPU#0) 410 to (SPU#7) 480, and a bus 490 and is connected to an image memory 120 and a display unit 130. The multiprocessor 110 is an example of an object detecting system described in claims.

The control processor (PPU) 200 mainly controls the arithmetic processors (SPU#0) 410 to (SPU#7) 480. Specifically, the control processor 200 allocates face detection processing to the arithmetic processors 410 to 480 on the basis of an area of an input image, which is a face detection target, stored in the image memory 120. When the face detection processing for the input image is finished, the control processor 200 generates, in order to detect faces of different sizes, reduced images formed by sequentially reducing the input image at a predetermined reduction ratio and stores the reduced images in the image memory 120. The control processor 200 allocates the face detection processing to the arithmetic processors 410 to 480 on the basis of areas of the reduced images and repeats the allocation of the face detection processing until the size of the reduced images decreases to predetermined minimum size. The control processor 200 collects face detection results concerning the input image and the plural reduced images received from the arithmetic processors 410 to 480 and calculates a final face detection result concerning the input image. The control processor 200 generates an output image on the basis of the face detection result and supplies the output image to the display unit 130. The control processor 200 is an example of an object detection control apparatus described in claims.

The arithmetic processors (SPU#0) 410 to (SPU#7) 480 perform the face detection processing on the basis of an instruction from the control processor (PPU) 200. The arithmetic processors 410 to 480 output a detection result to the control processor 200 together with end notification of the face detection processing. The arithmetic processors 410 to 480 are examples of an object detecting unit and an object detecting apparatus described in claims.

The bus 490 connects the control processor 200, the arithmetic processors 410 to 480, the image memory 120, and the display unit 130 to one another. Data access among the components is performed through the bus 490.

The image memory 120 stores data necessary for processing by the processors. The image memory 120 stores input image data and reduced image data generated by the control processor 200 on the basis of the input image data.

The display unit 130 displays the face detection result, which is supplied from the control processor 200, as an output image. The display unit 130 can be realized by, for example, an LCD (Liquid Crystal Display).

In the example explained above, the multiprocessor 110 includes eight arithmetic processors. However, the number of arithmetic processors is not limited to this.

Figure 2:
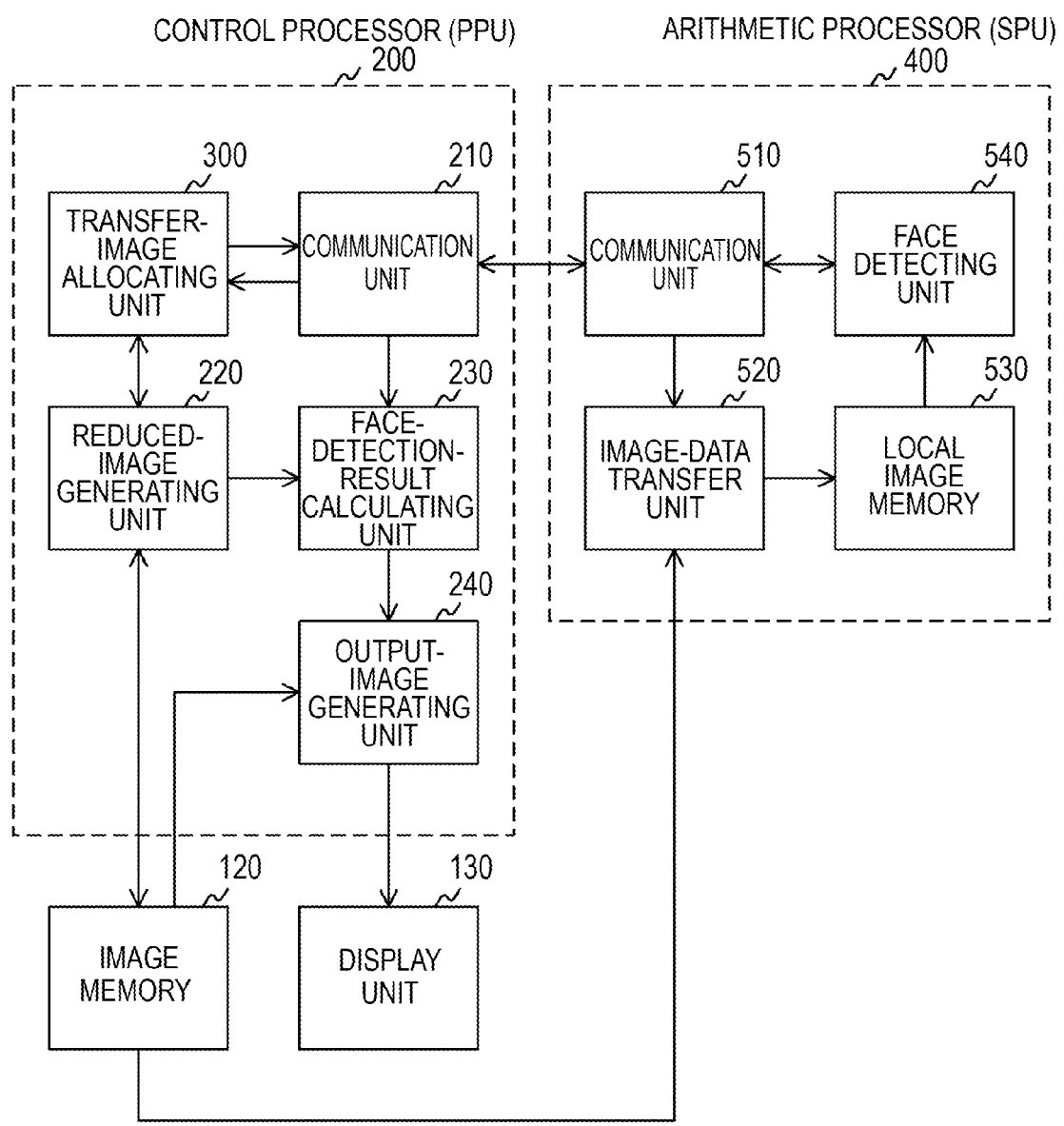
FIG. 2 is a block diagram of a functional configuration example of a control processor (PPU) 200 and an arithmetic processor (SPU) 400 according to the embodiment.

FIG. 2 is a block diagram of a functional configuration example of the control processor (PPU) 200 and the arithmetic processor (SPU) 400 according to this embodiment. The control processor 200, the arithmetic processor 400, the image memory 120, and the display unit 130 are shown in the figure. The image memory 120 and the display unit 130 have functions same as those shown in FIG. 1. Therefore, explanation of the functions is omitted.

The control processor (PPU) 200 includes a transfer-image allocating unit 300, a communication unit 210, a reduced-image generating unit 220, a face-detection-result calculating unit 230, and an output-image generating unit 240. The arithmetic processor (SPU) 400 includes a communication unit 510, an image-data transfer unit 520, a local image memory 530, and a face detecting unit 540.

The transfer-image allocating unit 300 sequentially allocates the face detection processing to the arithmetic processors 400. The transfer-image allocating unit 300 allocates a face detection area to the arithmetic processors 400 while moving the face detection area by a predetermined number of pixels at a time. According to the sequential movement of the face detection area, it becomes necessary to transfer data to the local image memory 530 of the arithmetic processor 400 anew. Therefore, the transfer-image allocating unit 300 notifies the arithmetic processor 400 of transfer image area information indicating an area of data that needs to be transferred anew according to the face detection area (hereinafter referred to as "transfer image area"). Consequently, the arithmetic processor 400 transfers the data to the local image memory 530 on the basis of the transfer image area information from the control processor 200 and performs the face detection processing in the face detection area decided from the transfer image area information. The transfer image area information includes a start point address, the height, and the width of the transfer image area. Therefore, when the transfer-image allocating unit 300 determines the arithmetic processor 400 to which the face detection processing should be allocated next, the transfer-image allocating unit 300 generates a number of the arithmetic processor and a start point address, the height, and the width of a transfer image area and supplies the same to the communication unit 210. In this embodiment, when the transfer-image allocating unit 300 allocates the face detection processing to the arithmetic processor 400, the transfer-image allocating unit 300 moves the face detection area in the right direction by two pixels at a time.

When the transfer-image allocating unit 300 receives end notification of the detection processing from the arithmetic processors and the face detection processing for one input image or reduced image is finished, the transfer-image allocating unit 300 instructs the reduced-image generating unit 220 to generate a reduced image. The transfer-image allocating unit 300 acquires, as an area of the reduced image generated on the image memory 120, for example, a start point address, the height, and the width of the reduced image on the image memory 120 from the reduced-image generating unit 220. After this, the transfer-image allocating unit 300 performs allocation of the face detection processing with the reduced image set as a target. The transfer-image allocating unit 300 is an example of a detection-processing allocating unit, a size generating unit, and a reference-position generating unit described in claims.

The communication unit 210 performs communication between the control processor 200 and the arithmetic processors 400. The communication unit 210 transmits transfer image area information to an arithmetic processor corresponding to a number of an arithmetic processor supplied from the transfer-image allocating unit 300. The communication unit 210 supplies end notification of the face detection processing and face detection results from the arithmetic processors 400 to the transfer-image allocating unit 300 and the face-detection-result calculating unit 230, respectively.

The reduced-image generating unit 220 reduces the input image or the reduced image on the image memory 120 at a predetermined reduction ratio on the basis of an instruction from the transfer-image allocating unit 300 and causes the image memory 120 to store the input image or the reduced image. The reduced-image generating unit 220 notifies the transfer-image allocating unit 300 of area information of the reduced image stored in the image memory 120. When the size of the reduced image decreases to a predetermined minimum size, the reduced-image generating unit 220 notifies the transfer-image allocating unit 300 and the face-detection-result calculating unit 230 of that effect.

When the face detection processing is finished in the reduced image of the minimum size generated by the reduced-image generating unit 220, the face-detection-result calculating unit 230 calculates a face detection result (a position, the size, and the like of a face) for the input image on the basis of the face detection results from the arithmetic processors 400. The face-detection-result calculating unit 230 supplies the face detection result to the output-image generating unit 240.

The output-image generating unit 240 generates a face area image indicating an area of a face corresponding to the input image on the basis of the face detection result from the face-detection-result calculating unit 230, combines the face area image with the input image, and outputs a combined image to the display unit 130.

In the arithmetic processor (SPU) 400, the communication unit 510 performs communication between the arithmetic processor 400 and the control processor 200. The communication unit 510 supplies the transfer image area information from the control processor 200 to the image-data transfer unit 520 and the face detecting unit 540. The communication unit 510 transmits end notification and a face detection result from the face detecting unit 540 to the communication unit 210 of the control processor 200.

The image-data transfer unit 520 transfers the image data stored in the image memory 120 to the local image memory 530 on the basis of the transfer image area information from the control processor 200.

The local image memory 530 stores the image data transferred by the image-data transfer unit 520.

The face detecting unit 540 calculates a face detection area on the basis of the transfer image area information from the control processor 200 and detects a face included in image data in the face detection area. Specifically, the face detecting unit 540 calculates an end point address of the image data stored in the local image memory 530 from the start point address and the width of the transfer image area and calculates a face detection area on the basis of the end point address. It is assumed that the width of the face detection area is 20 pixels and the height thereof is the height of the transfer image area.

Figure 3:
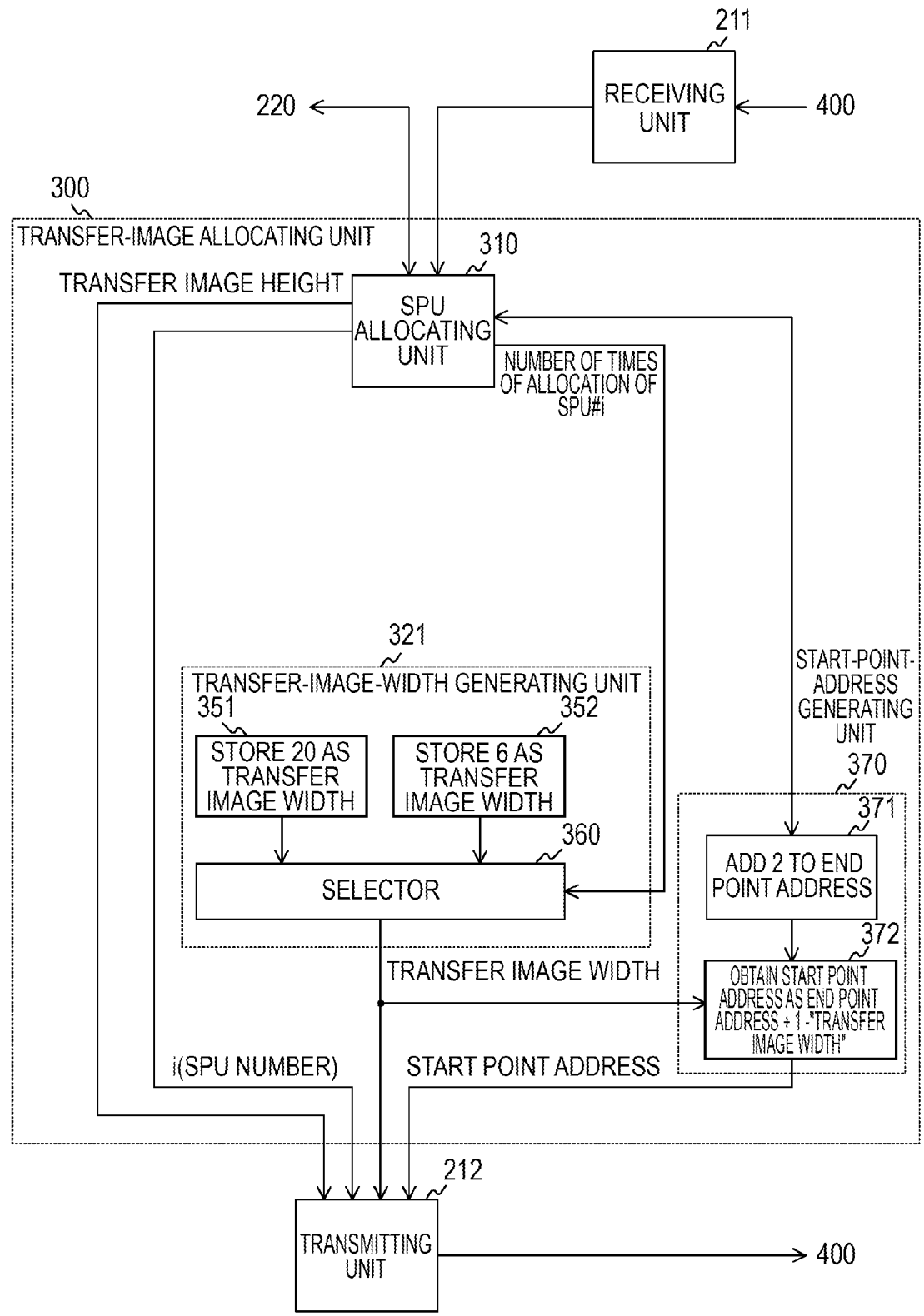
FIG. 3 is a block diagram of a configuration example of a transfer-image allocating unit 300 in a first example of the face detecting apparatus 100 according to the embodiment.

FIG. 3 is a block diagram of a configuration example of the transfer-image allocating unit 300 in a first example of the face detecting apparatus 100 according to this embodiment. The transfer-image allocating unit 300, a receiving unit 211, and a transmitting unit 212 are shown in the figure. The receiving unit 211 and the transmitting unit 212 correspond to the communication-unit 210 and perform communication between the control processor 200 and the arithmetic processor 400.

The transfer-image allocating unit 300 includes an SPU allocating unit 310, a transfer-image-width generating unit 321, and a start-point-address generating unit 370.

The SPU allocating unit 310 sequentially allocates the face detection processing to the plural arithmetic processors 400. For example, as shown in FIGS. 4A to 4I referred to later, it is assumed that the SPU allocating unit 310 allocates the face detection processing to the three arithmetic processors 410 (SPU#0) to (SPU#2) 430 shown in FIG. 1. In this case, after receiving end notification from all of the arithmetic processors 410 to 430, the SPU allocating unit 310 allocates the face detection processing to the arithmetic processors 410 to 430 in predetermined order. For example, the SPU allocating unit 310 allocates the face detection processing to the arithmetic processors in order in a circulating manner, for example, allocates the face detection processing to the arithmetic processor (SPU#0) 430 first, to the arithmetic processor (SPU#1) 420 second, to the arithmetic processor (SPU#2) 430 third, and to the arithmetic processor (SPU#3) 410 fourth.

The SPU allocating unit 310 supplies a number of the arithmetic processor, to which the face detection processing is allocated, and the height of a transfer image area (an input image or a reduced image) to the transmitting unit 212. At the same time, the SPU allocating unit 310 supplies an allocation timing signal to the start-point-address generating unit 370 and supplies the number of times the face detection processing is applied to the arithmetic processor to the transfer-image-width generating unit 321. When an end point address of the transfer image area supplied from the start-point-address generating unit 370 coincides with an end point address of the input image or the reduced image, the SPU allocating unit 310 instructs the reduced-image generating unit 220 to generate a reduced image. The SPU allocating unit 310 acquires a start point address, the height, and the width of the reduced image from the reduced-image generating unit 220. The SPU allocating unit 310 is an example of a detection-processing allocating unit described in claims.

The transfer-image-width generating unit 321 supplies transfer image width to the transmitting unit 212 and the start-point-address generating unit 370 on the basis of the number of times of allocation from the SPU allocating unit 310. The transfer-image-width generating unit 321 is an example of a size generating unit described in claims. The transfer-image-width generating unit 321 includes transfer-image-width storing units 351 and 352 and a selector 360.

The selector 360 selects any one of the transfer-image-width storing units 351 and 352 on the basis of the number of times of allocation from the SPU allocating unit 310 and outputs transfer image width to the transmitting unit 212. For example, when the number of times of allocation from the SPU allocating unit 310 is "1", the selector 360 outputs an initial value (20) of transfer image width stored in the transfer-image-width storing unit 351 to the transmitting unit 212 and the start-point-address generating unit 370. On the other hand, when the number of times of allocation from the SPU allocating unit 310 is other than "1", the selector 360 transfers image width (6) stored in the transfer-image-width storing unit 352 to the transmitting unit 212 and the start-point-address generating unit 370. The transfer image width can be represented by the following formula:

transfer image width=moving steps of a face detection area×total number of arithmetic processors The moving steps of the face detection area mean the number of pixels by which the face detection area is moved every time the face detection processing is allocated. The moving steps of the face detection area are 2. Therefore, the transfer image width is 6 (=2×3).

The start-point-address generating unit 370 generates a start point address of the transfer image area on the basis of the allocation timing from the SPU allocating unit 310. The start-point-address generating unit 370 supplies the start point address of the transfer image area to the transmitting unit 212. The start-point-address generating unit 370 is an example of a reference generating unit described in claims.

The start-point-address generating unit 370 includes an end-point-address output unit 371 and a start-point-address output unit 372. The end-point-address output unit 371 increments an end point address of the transfer image area by "2" at every allocation timing from the SPU allocating unit 310. Consequently, the transfer-image allocating unit 300 can allocate the face detection area while moving the face detection area by two pixels at a time. A reference of the end point address of the transfer image area is, for example, a position obtained by adding the width (20) of the face detection area to the start point address of the input image or the reduced image. The end-point-address output unit 371 outputs the incremented end point address of the transfer image area to the start-point-address output unit 372. The start-point-address output unit 372 outputs the start point address of the transfer image area using the end point address from the end-point-address output unit 371 and the transfer image width from the transfer-image-width generating unit 321. Specifically, the start point address of the transfer image area is calculated by reducing the transfer image width from the end point address added with 1. The start-point-address output unit 372 supplies the output start point address to the transmitting unit 212.

In this way, the transfer-image allocating unit 300 supplies the number of the arithmetic processor to which the face detection processing is allocated and the start point address, the height, and the width of the transfer image area, which are transfer image area information.

FIGS. 4A to 4I are conceptual diagrams of a processing method in the first example of the face detecting apparatus 100 according to this embodiment. In FIGS. 4A to 4I, relations among the local image memories 530, the transfer image areas, and the face detection areas 401 of the arithmetic processor (SPU#0) 410 to the arithmetic processor (SPU#2) 430 are shown in order from the left. In this example, for convenience of explanation, face detection processing by the three arithmetic processors (SPU#0) 410 to (SPU#2) 430 is assumed. It is assumed that the face detection processing is allocated by the control processor 200 in order of FIGS. 4A to 4I. Numerical values shown above frames of the local image memories represent numbers of pixel columns at both right and left ends in the face detection areas 401. Pixel rows at left ends of the local image memories are represented as 0th columns.

In FIGS. 4A to 4I, the face detection area 401 moves in the right direction by two pixels at a time. Transfer image areas 411, 421, and 431 having size same as that of the face detection area 401 are transferred to the arithmetic processors 410 to 430.

Figure 4A:
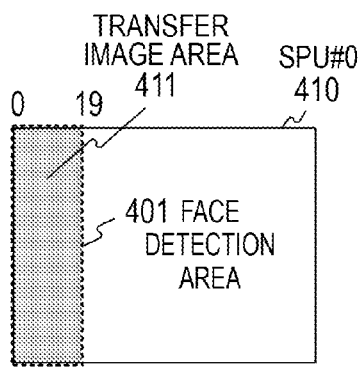
FIGS. 4A to 4I are conceptual diagrams of a processing method in the first example of the face detecting apparatus 100 according to the embodiment.
Figure 4B:
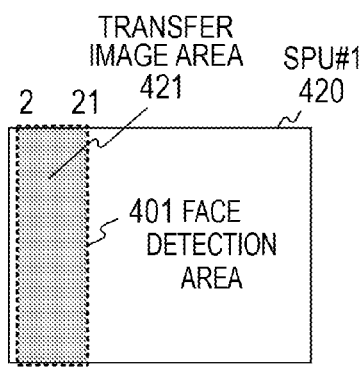
Figure 4C:
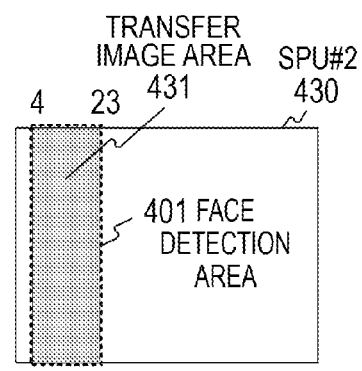
Figure 4D:
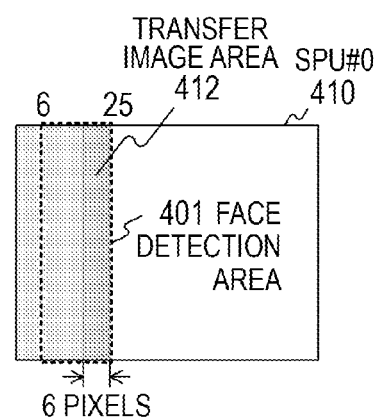
Figure 4E:
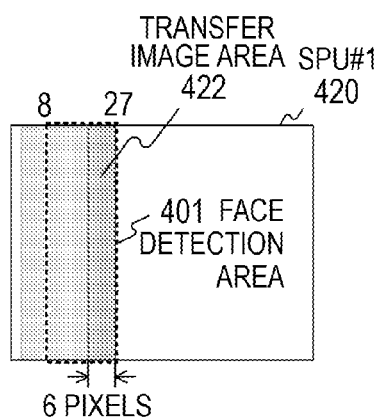
Figure 4F:
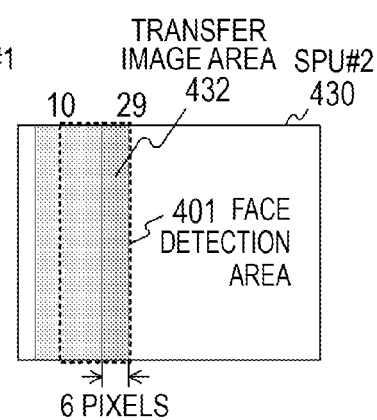
Figure 4G:
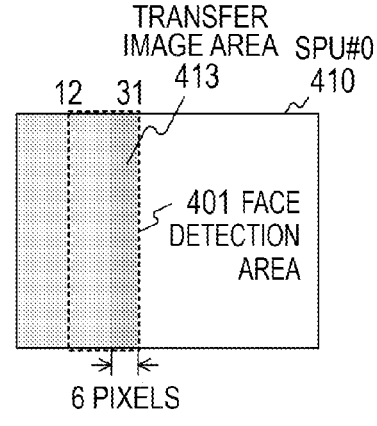
Figure 4H:
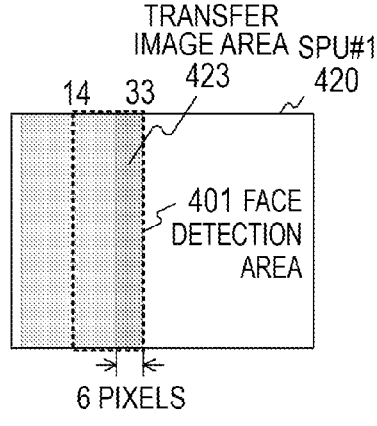
Figure 4I:
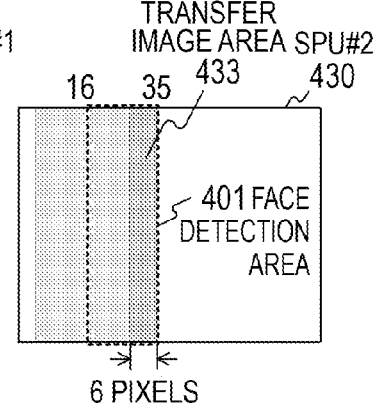

The face detection processing is allocated to the arithmetic processor (SPU#0) 410 in order of FIGS. 4A, 4D, and 4G. In FIGS. 4D and 4G, the transfer image areas 412 and 413 having 6-pixel width, which becomes necessary because the face detection area 401 moves by two pixels at a time, are transferred to the arithmetic processor (SPU#0) 410. The face detection processing is allocated to the arithmetic processor (SPU#1) 420 in order of FIGS. 4B, 4E, and 4H. In FIGS. 4E and 4H, the transfer image areas 422 and 423 having 6-pixel width are transferred to the arithmetic processor (SPU#1) 420 in the same manner as the transfer to the arithmetic processor 410. The arithmetic processor (SPU#2) 430 is also processed as explained above.

Processing speed of the face detection processing can be improved by sequentially allocating the face detection processing to the three arithmetic processors 410 to 430 in this way. Transfer image width can be uniquely decided by sequentially allocating the face detection processing to the arithmetic processors 410 to 430.

Operation of the control processor 200 and the arithmetic processor 400 according to this embodiment is explained with reference to drawings.

Figure 5:
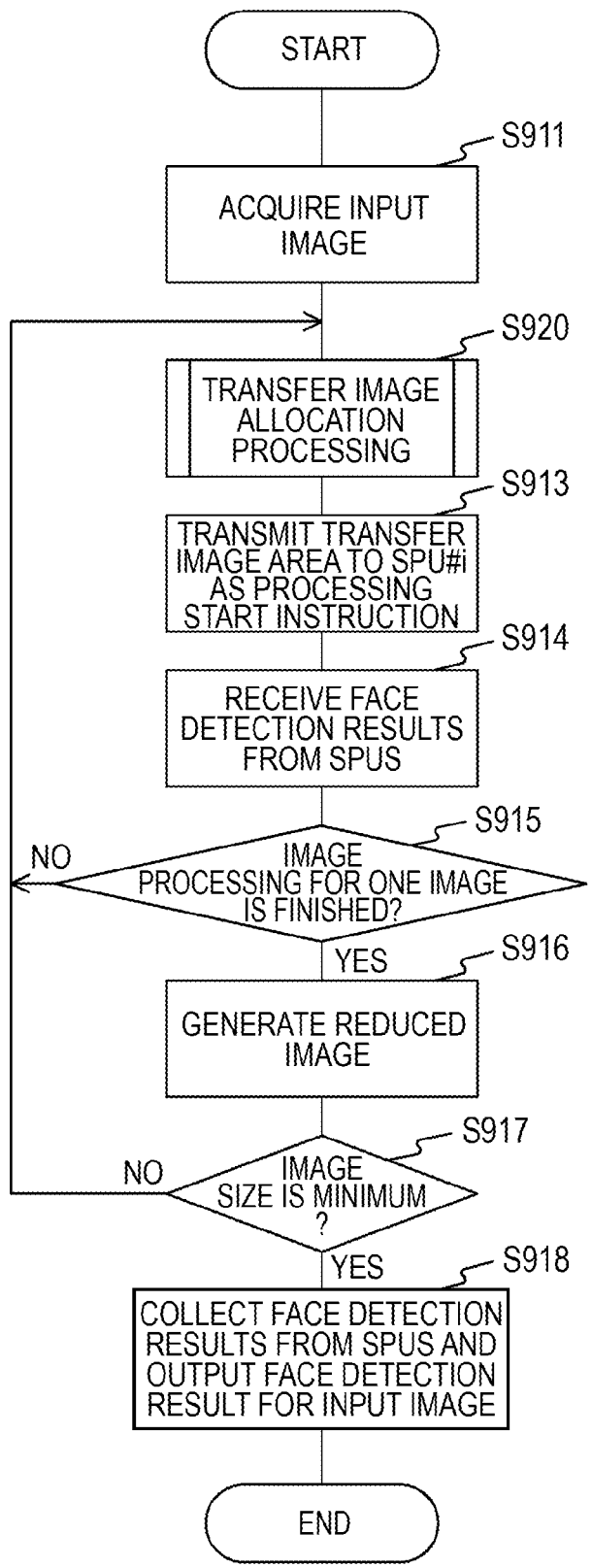
FIG. 5 is a flowchart of a processing procedure example of a face detection processing control method of the control processor 200 in the first example of the face detecting apparatus 100 according to the embodiment.

FIG. 5 is a flowchart of a processing procedure example of a face detection processing control method of the control processor 200 in the first example of the face detecting apparatus 100 according to this embodiment.

First, the control processor 200 acquires, using the transfer-image allocating unit 300, a start point address, the height, and the width of an input image on the image memory 120 (step S911). Subsequently, the control processor 200 executes, using the transfer-image allocating unit 300, the transfer image allocation processing on the basis of the start point address, the height, and the width of the input image (step S920). The control processor 200 transmits transfer image area information to the arithmetic processor (SPU#i), to which the face detection processing is allocated, as a processing start instruction (step S913). The control processor 200 receives end notifications from the arithmetic processors (step S914). The control processor 200 determines, using the transfer-image allocating unit 300, whether the face detection processing for one input image or reduced image is finished (step S915). When the face detection processing for one input image or reduced image is not finished, the control processor 200 returns to step S920.

On the other hand, when the face detection processing for one input image or reduced image is finished, the control processor 200 generates, using the reduced-image generating unit 220, a reduced image at a predetermined reduction ratio and stores the reduced image in the image memory 120 (step S916). The control processor 200 determines whether the reduced image is smaller than predetermined size (step S917). When the reduced image is larger than the predetermined size, the control processor 200 returns to step S920 and executes the transfer image allocation processing on the basis of a start point address, the height, and the width of the reduced image.

On the other hand, when the reduced image is smaller than the predetermined size, the control processor 200 calculates a final face detection result concerning the input image on the basis of a face detection result concerning an input image and plural reduced images received from each of the arithmetic processors (SPU) 400 (step S918).

Figure 6:
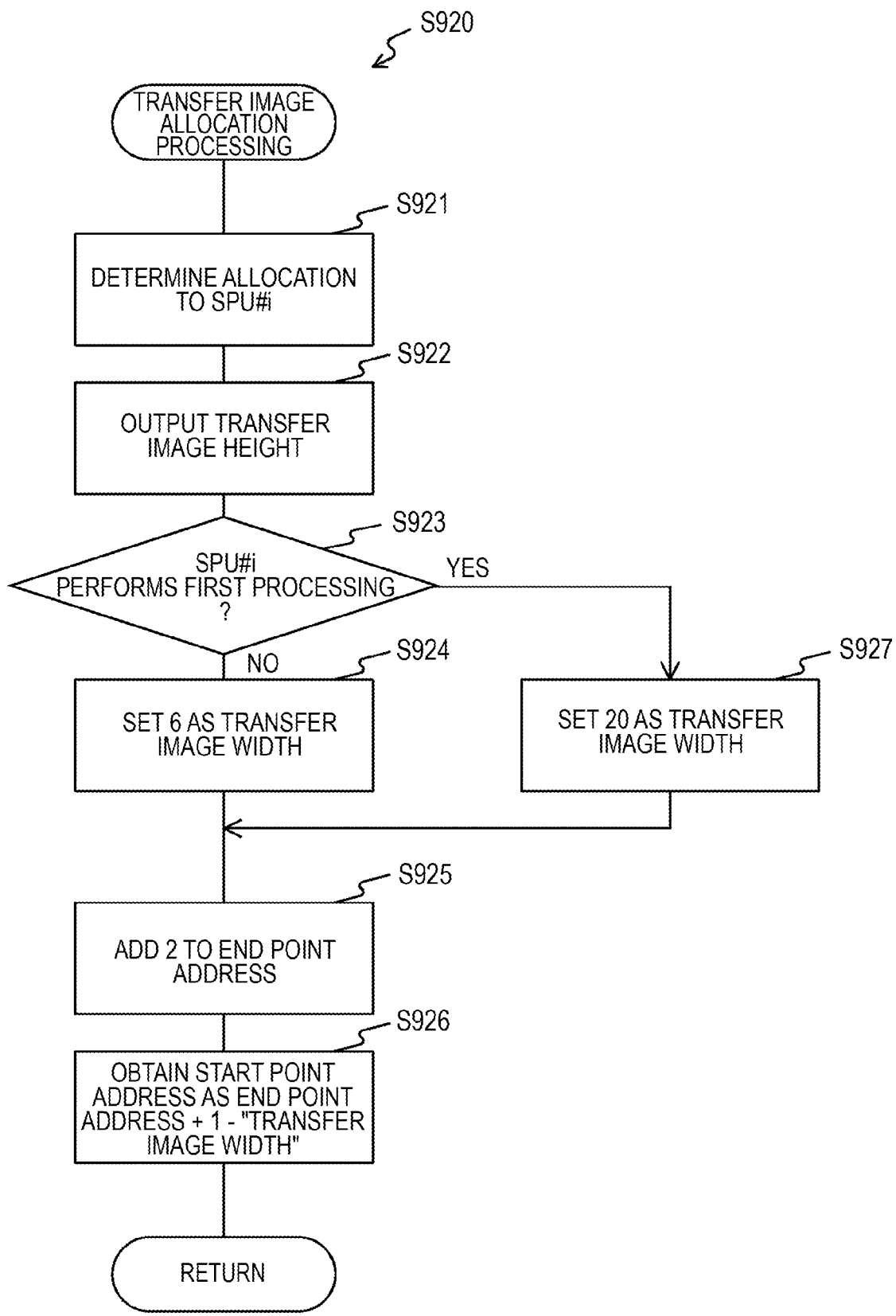
FIG. 6 is a flowchart of a processing procedure example of transfer image allocation processing (step S920) of the control processor 200 in the first example of the face detecting apparatus 100 according to the embodiment.

FIG. 6 is a flowchart of a processing procedure example of the transfer image allocation processing (step S920) of the control processor 200 in the first example of the face detecting apparatus 100 according to this embodiment. The face detection processing by the three arithmetic processors 410 to 430 is assumed.

First, the control processor 200 allocates, using the SPU allocating unit 310, the face detection processing to the arithmetic processor (SPU#i) 400 (step S921). Step S921 is an example of detection processing allocation procedure described in claims. Subsequently, the control processor 200 outputs transfer image height using the SPU allocating unit 310 (step S922). The control processor 200 determines whether the arithmetic processor (SPU#i) 400 performs first face detection processing (step S923). In the case of the first face detection processing, the control processor 200 sets an initial value "20" as the transfer image width (step S927). On the other hand, in the case of second or subsequent face detection processing, the control processor 200 sets "6" as the transfer image width (step S924). Step S924 is an example of a size generation procedure described in claims.

The control processor 200 adds 2 to an end point address using the end-address output unit 371 (step S925). The control processor 200 outputs, using the start-point-address output unit 372, a start point address obtained by adding 1 to the end point address and reducing the transfer image width from the end point address (step S926). Consequently, the control processor 200 generates a start point address, the height, and the width of a transfer image area and transmits the same as an image transfer area. Steps S925 and S926 are an example of a reference position generation procedure described in claims.

Figure 7:
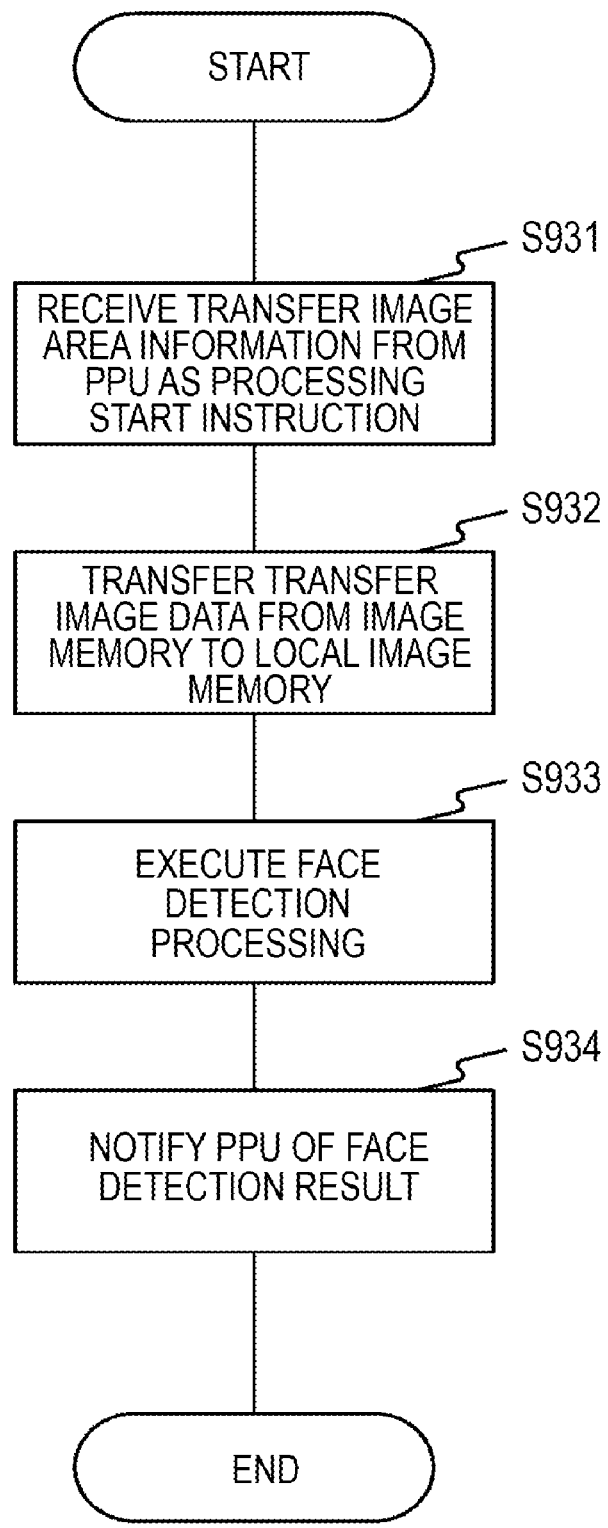
FIG. 7 is a flowchart of a processing procedure example of a face detecting method by the arithmetic processor 400 according to the embodiment.

FIG. 7 is a flowchart of a processing procedure example of a face detecting method by the arithmetic processor 400 according to this embodiment.

First, the arithmetic processor 400 receives transfer image area information as a processing start instruction from the control processor (PPU) 200 (step S931). Subsequently, the arithmetic processor 400 acquires, using the image-data transfer unit 520, data of a transfer image area from the image memory 120 on the basis of the transfer image area information and transfers the data to the local image memory 530 (step S932). The arithmetic processor 400 specifies, using the face detecting unit 540, a face detection area on the basis of the transfer image area information and performs the face detection processing in the face detection area (step S933).

The arithmetic processor 400 transmits a face detection result to the control processor (PPU) 200 (step S934).

As explained above, in the first example in this embodiment, it is possible to improve processing speed of the face detection processing by causing the plural arithmetic processors to simultaneously execute plural kinds of face detection processing. The transfer image width can be uniquely decided by allocating the face detection processing to the plural arithmetic processors in order.

Figure 8A:
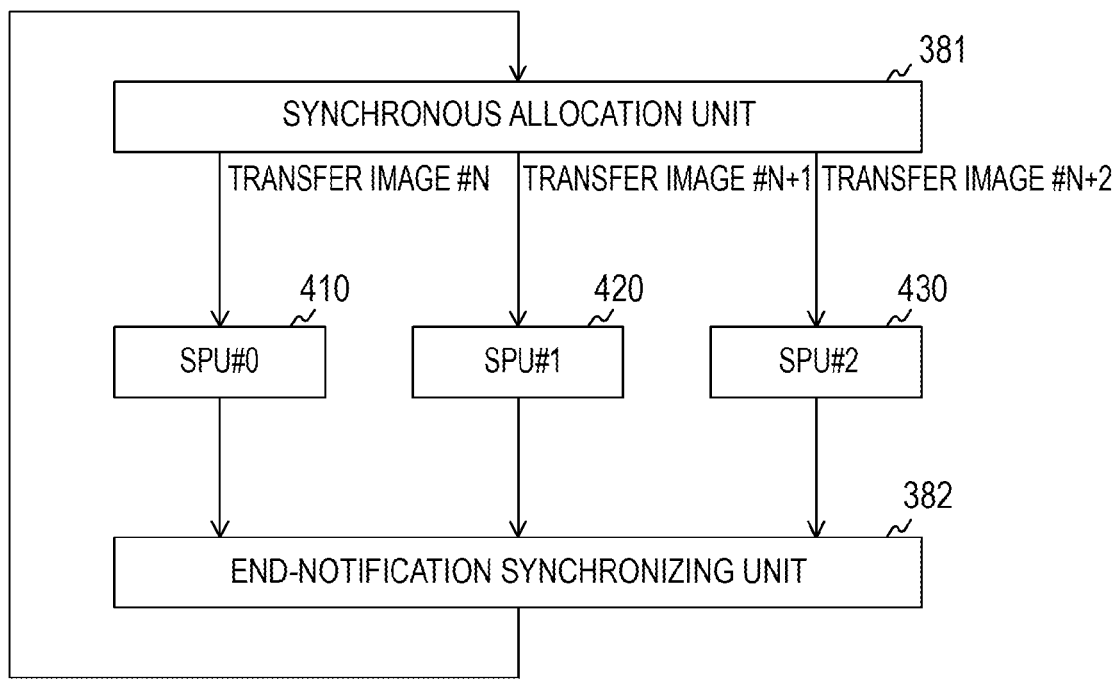
FIGS. 8A and 8B are block diagrams of modifications of a multiprocessor 110 in the first example of the face detecting apparatus 100 according to the embodiment.
Figure 8B:
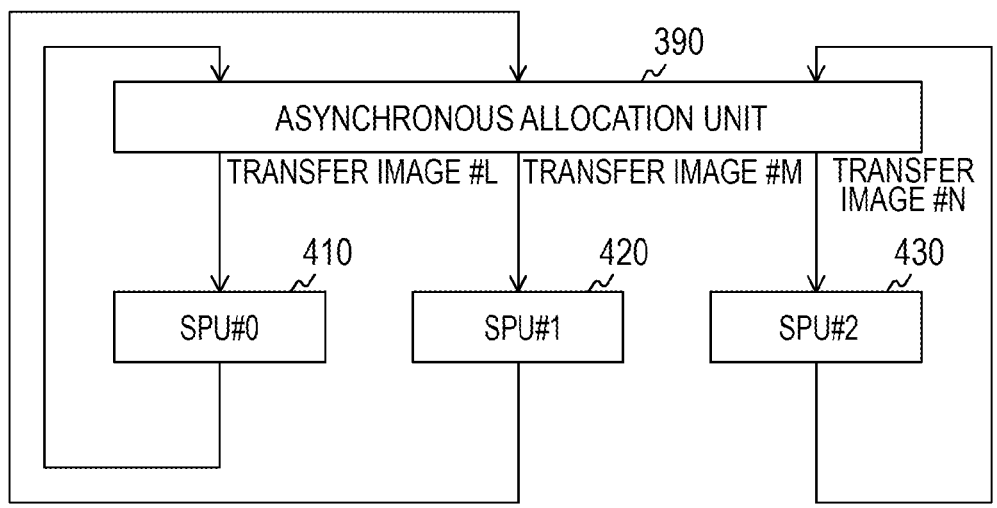

FIGS. 8A and 8B are block diagrams of a modification of the multiprocessor 110 in the first example of the face detecting apparatus 100 according to this embodiment. The face detection processing by the three arithmetic processors 410 to 430 is assumed. Since the functions of the arithmetic processors 410 to 430 are explained above, explanation of the functions is omitted. FIG. 8A is a schematic diagram of a method of allocating the face detection processing in the first example of this embodiment. FIG. 8B is a schematic diagram of a modification of the method of allocating the face detection processing in the first example of this embodiment.

In FIG. 8A, a synchronous allocation unit 381, the arithmetic processors (SPU#0) 410 to (SPU#2) 430, and an end-notification synchronizing unit 382 are shown. The synchronous allocation unit 381 and the end-notification synchronizing unit 382 correspond to the control processor 200.

The synchronous allocation unit 381 allocates the face detection processing in order of SPU#0, SPU#1, and SPU#2. The synchronous allocation unit 381 generates transfer image area information on the basis of the order and transmits the transfer image area information to the SPUs. When the end-notification synchronizing unit 382 receives all end notifications from SPU#0 to SPU#2 and detects that synchronization is realized, the end-notification synchronizing unit 382 notifies the synchronous allocation unit 381 that the synchronization is realized.

When the next allocation is performed after the end notifications from all the SPUs are received in this way, the SPU that finishes the face detection processing earlier is put in a standby state. Therefore, a method of solving the standby state is briefly explained with reference to FIG. 8B.

In FIG. 8B, an asynchronous allocation unit 390 and the arithmetic processors (SPU#0) 410 to (SPU#2) 430 are shown. The asynchronous allocation unit 390 is provided instead of the synchronous allocation unit 381 and the end-notification synchronizing unit 382. When the asynchronous allocation unit 390 receives end notification from each of the SPUs, the asynchronous allocation unit 390 allocates the next face detection processing without waiting for end notifications from the other SPUs.

In this way, when the asynchronous allocation unit 390 receives the end notification from the SPU, the asynchronous allocation unit 390 performs the asynchronous allocation for allocating the next face detection processing without waiting for end notifications from the other SPUs. Therefore, no SPU is in the standby state and it is possible to further improve the processing speed. However, in this case, it is likely that the loss of transfer image area data occurs in the face detection area.

Figure 9:
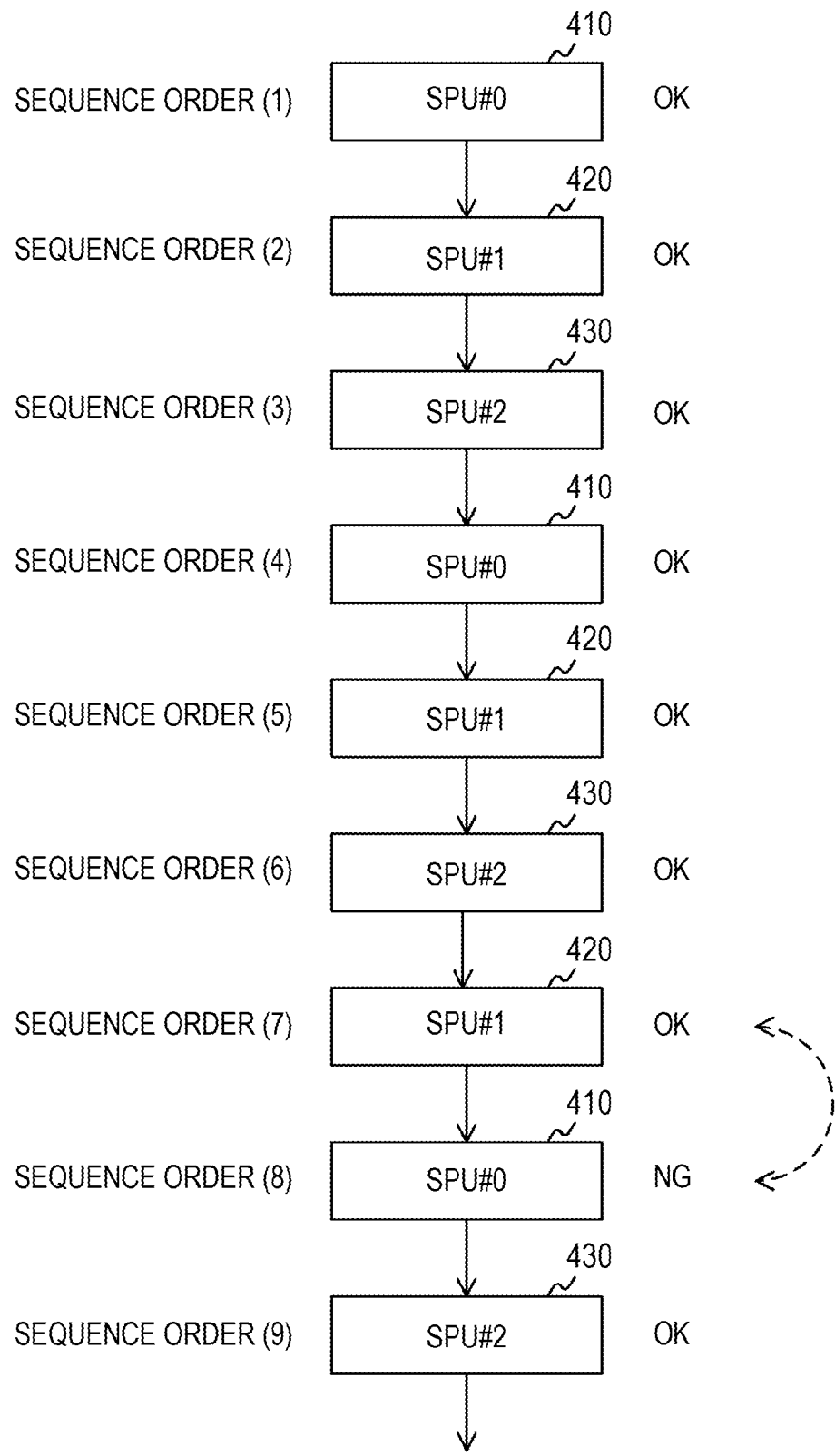
FIG. 9 is a block diagram of processing sequential orders of the arithmetic processor (SPU) 400 involved in asynchronous allocation.

FIG. 9 is a block diagram of processing sequential orders of the arithmetic processor (SPU) 400 involved in the asynchronous allocation. The face detection processing by the three arithmetic processors 410 to 430 is assumed. In FIG. 9, sequential orders of allocation of the face detection processing by the control processor (PPU) 200 are shown in order from the top. By performing the asynchronous allocation shown in FIG. 8B, processing sequential orders of SPU#1 and SPU#0 are interchanged in sequential order (7) and sequential order (8). In this case, in SPU#1 in sequential order (8), a part of transfer image area data in a detection area is lost and it is difficult to accurately execute the face detection processing. An example in which a part of the transfer image area data is lost is explained with reference to drawings.

FIGS. 10A to 10I are conceptual diagrams of a face detection processing example to which the asynchronous allocation shown in FIG. 8B is applied. In this example, for convenience of explanation, the face detection processing by the three arithmetic processors (SPU#0) 410 to (SPU#2) 430 is assumed. It is assumed that the control processor 200 allocates the face detection processing in order of FIGS. 10A to 10I. Figures except FIGS. 10G and 10H are the same as FIGS. 4A to 4F and 4I. Therefore, explanation of the figures is omitted.

In FIGS. 10G and 10H, the control processor 200 interchanges sequential orders allocated to the arithmetic processor (SPU#1) 420 and the arithmetic processor (SPU#0) 410. In this case, in FIG. 1H, the loss of an image occurs in the face detection area 401 in the arithmetic processor (SPU#0) 410. The loss of an image occurs because the face detection area 401 of the SPU#0 moves in the right direction by two pixels from the face detection area 401 shown in FIG. 4G according to the interchange of the sequential orders of SPU#0 and SPU#1. In FIG. 10G, since SPU#1 is allocated earlier than SPU#0, the transfer image area 424 partially overlaps the transfer image area 422. However, the loss of an image in the face detection area 401 does not occur.

Figure 11:
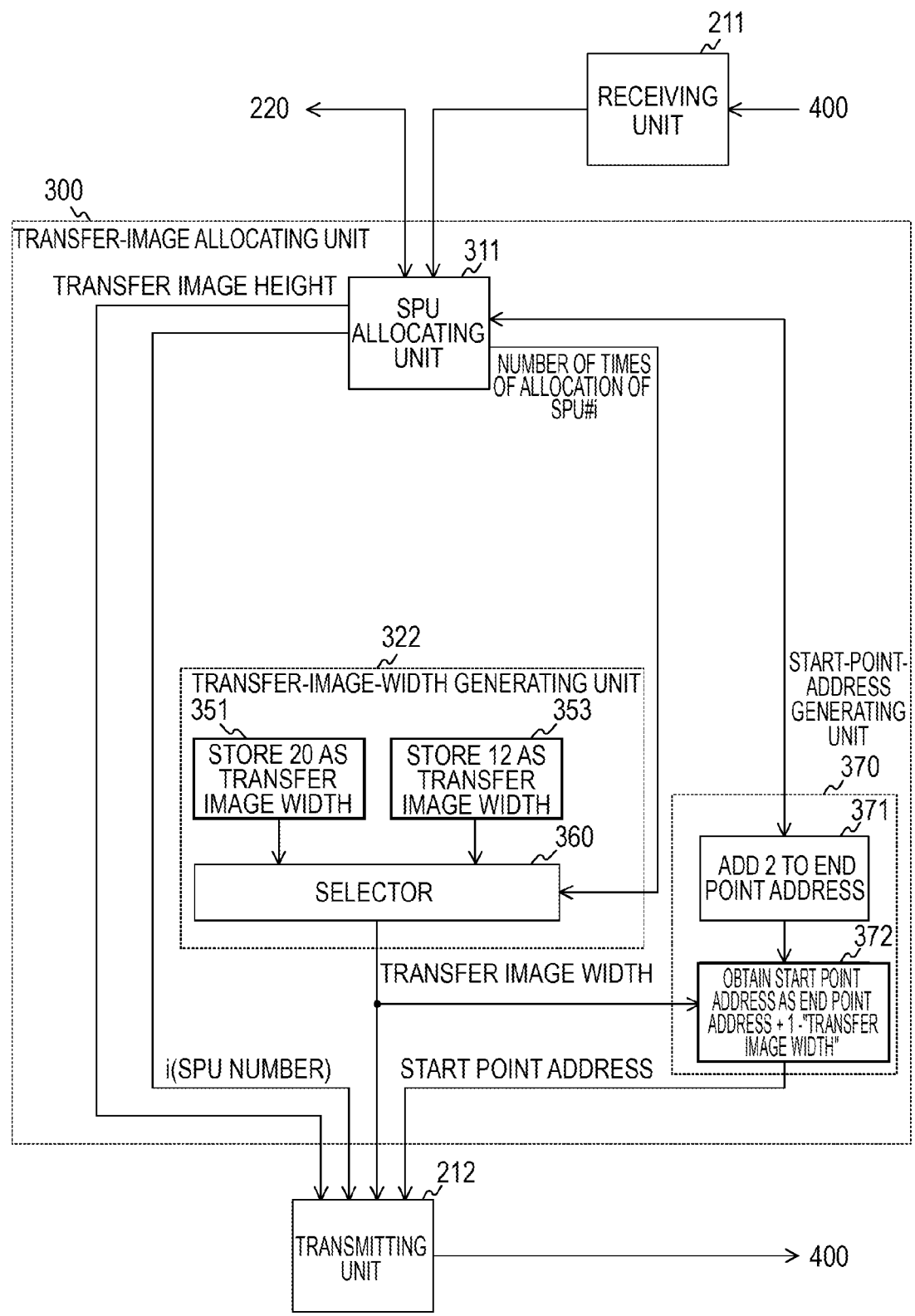
FIG. 11 is a block diagram of a configuration of the transfer-image allocating unit 300 in a second example of the face detecting apparatus 100 according to the embodiment.

FIG. 11 is a block diagram of a configuration of the transfer-image allocating unit 300 in a second example of the face detecting apparatus 100 according to this embodiment. The transfer-image allocating unit 300, the receiving unit 211, and the transmitting unit 212 are shown in the figure. The receiving unit 211 and the transmitting unit 212 correspond to the communication unit 210 and perform communication between the control processor 200 and the arithmetic processor 400. In this example, it is assumed that the multiprocessor 110 includes the three arithmetic processors (SPU#0) 410 to (SPU#2) 430.

The transfer-image allocating unit 300 includes an SPU allocating unit 311 and a transfer-image-width storing unit 353 instead of the SPU allocating unit 310 and the transfer-image-width storing unit 352 shown in FIG. 3. Components other than the SPU allocating unit 311 and the transfer-image-width storing unit 353 are the same as those shown in FIG. 3. Therefore, explanation of the components is omitted.

When the SPU allocating unit 311 receives end notification from the arithmetic processor 400, the SPU allocating unit 311 allocates the next face detection processing to the arithmetic processor 400, which transmits the end notification, without waiting for end notifications of the other arithmetic processors 400. Other functions are the same as those of the SPU allocating unit 310. The SPU allocating unit 311 is an example of a detection-processing allocating unit described in claims.

The transfer-image-width storing unit 353 stores "12" as transfer image width. The transfer image width is set to a value enough for preventing occurrence of the loss of the transfer image area data in order to reduce image loss caused by changing sequential orders for allocating image processing to the arithmetic processors. As an example, the transfer image width is set to "12". This means that, after the face detection processing is allocated to one arithmetic processor, if the control processor 200 allocates the face detection processing to the other arithmetic processors five or less number of times in a period until the face detection processing is allocated to the arithmetic processor next time, the loss of the transfer image area data does not occur. "12" as a numerical value stored in the transfer-image storing unit 353 is an example of an estimated value described in claims.

In this way, when the SPU allocating unit 311 receives the end notification from the arithmetic processor, the SPU allocating unit 311 allocates the next face detection processing to the arithmetic processor without waiting for end notifications of the other arithmetic processors and sets a value of the transfer image width large enough for preventing the loss of the transfer image area data. This makes it possible to further improve the processing speed while maintaining accuracy of the face detection processing.

FIGS. 12A to 12I are conceptual diagrams of a processing method in the second example of the face detecting apparatus 100 according to this embodiment. In this example, for convenience of explanation, the face detection processing by the three arithmetic processors (SPU#0) 410 to (SPU#2) 430 is assumed. It is assumed that the control processor 200 allocates the face detection processing in order of FIGS. 12A to 12I. FIGS. 12A to 12C are the same as FIGS. 4A to 4C. Therefore, explanation of the figures is omitted.

In FIGS. 12D to 12I, transfer image area data having 12-pixel width is transferred into a face detection area. In FIGS. 12G to 12H, the control processor 200 interchanges sequential orders allocated to the arithmetic processor (SPU#1) 420 and the arithmetic processor (SPU#0) 410. In this case, in FIG. 10H, a transfer image area 514 having 12-pixel width is transferred in the arithmetic processor (SPU#0) 410. Therefore, the loss of an image does not occur in the face detection area 401. In FIGS. 12D to 12I, a part of transfer image area data transferred anew overlaps transfer image area data already stored.

Figure 13:
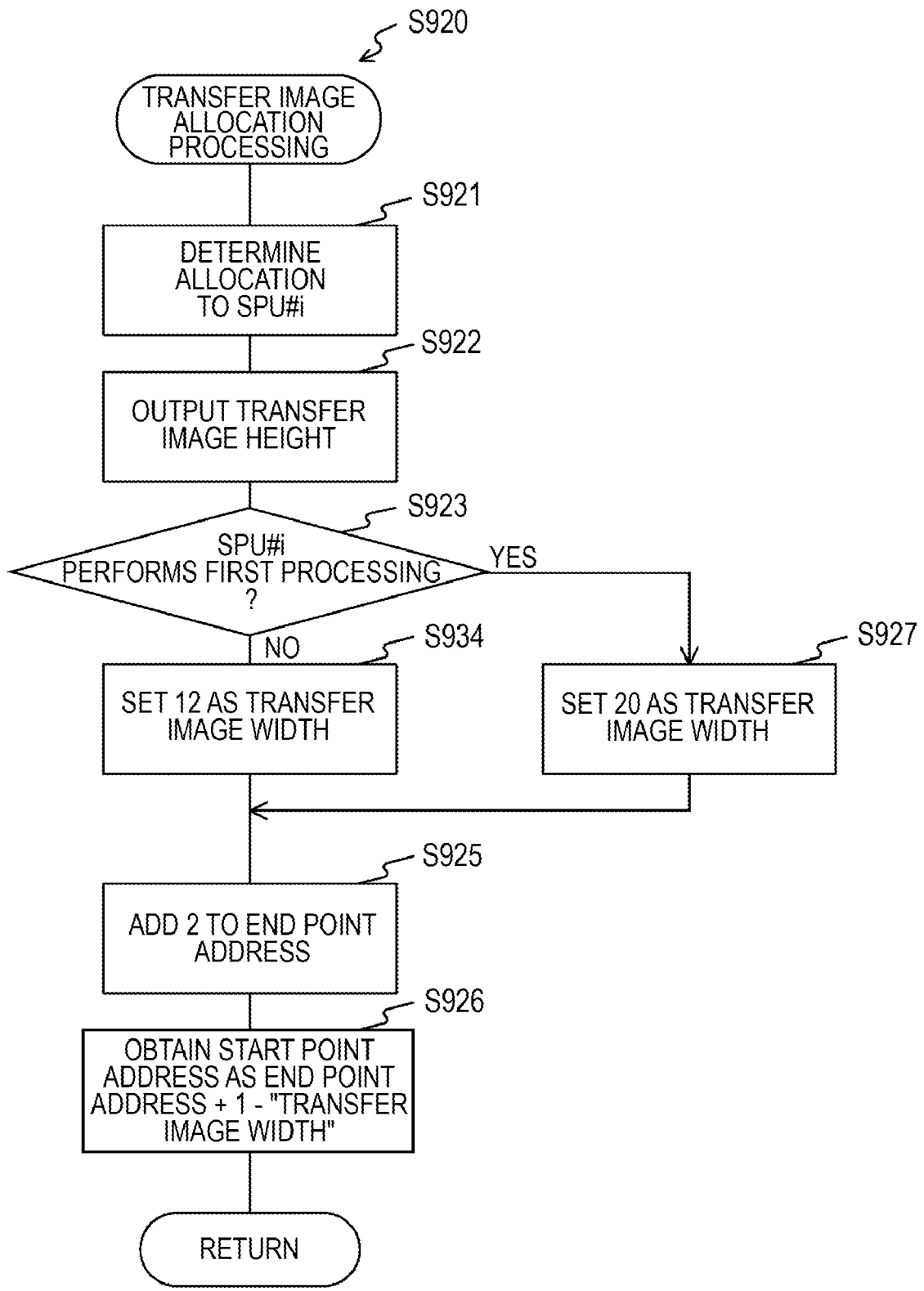
FIG. 13 is a flowchart of a processing procedure example of transfer image allocation processing (step S920) of the control processor 200 in the second example of the face detecting apparatus 100 according to the embodiment.

FIG. 13 is a flowchart of a processing procedure example of the transfer image allocation processing (step S920) of the control processor 200 in the second example of the face detecting apparatus 100 according to this embodiment. The face detection processing by the three arithmetic processors 410 to 430 is assumed. Step S934 is shown instead of step S924 shown in FIG. 6. Steps other than step S934 are the same as those shown in FIG. 6. Therefore, the steps are denoted by the same reference signs and explanation of the steps is omitted.

In step S923, the control processor 200 determines whether the arithmetic processor (SPU#i) 400 performs first face detection processing. When the arithmetic processor (SPU#i) 400 performs the first face detection processing, the control processor 200 sets the initial value "20" as the transfer image width (step S927). On the other hand, in the case of second or subsequent processing, the control processor 200 sets "12" as the transfer image width (step S934). The control processor 200 proceeds to step S925. Step S934 is an example of a size generation procedure described in claims.

As explained above, in the second example in this embodiment, when the SPU allocating unit 311 receives the end notification from the arithmetic processor, the SPU allocating unit 311 allocates the next face detection processing to the arithmetic processor without waiting for end notifications of the other arithmetic processors. This makes it possible to further improve the processing speed. Further, a value of the transfer image width is set to not cause the loss of the transfer image area data according to such asynchronous allocation processing. This makes it possible to maintain accuracy of the face detection processing.

Figure 14:
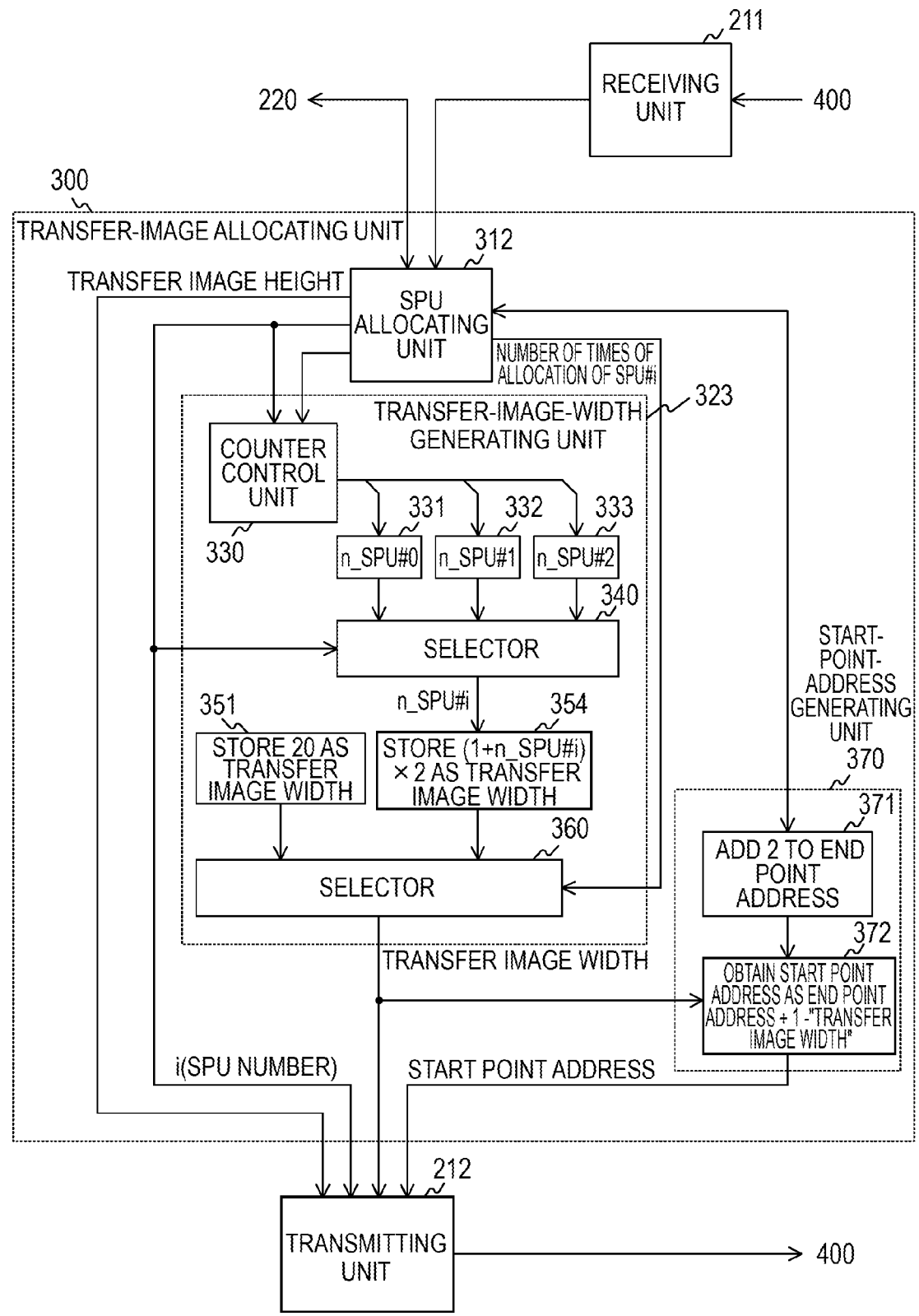
FIG. 14 is a block diagram of a configuration of the transfer-image allocating unit 300 in a third example of the face detecting apparatus 100 according to the embodiment.

FIG. 14 is a block diagram of a configuration of the transfer image allocating unit 300 in a third example of the face detecting apparatus 100 according to this embodiment. The transfer-image allocating-unit 300, the receiving-unit 211, and the transmitting unit 212 are shown in the figure. In this example, it is assumed that the multiprocessor 110 includes the three arithmetic processors 410 (SPU#0) to 430 (SPU#2). The receiving unit 211 and the transmitting unit 212 correspond to the communication unit 210 and perform communication between the control processor 200 and the arithmetic processor 400.

The transfer-image allocating unit 300 includes a transfer-image-width generating unit 323 instead of the transfer-image-width generating unit 322 shown in FIG. 11. Components other than the transfer-image-width generating unit 323 are the same as those shown in FIG. 11. Therefore, explanation of the components is omitted.

The transfer-image-width generating unit 323 includes a counter control unit 330, counters 331 to 333, a selector 340, a transfer-image-width storing unit 351, a transfer-image-width calculating unit 354, and a selector 360.

The counter control unit 330 controls the counters 331 to 333. The counter control unit 330 initializes counter values of the counters 331 to 333 or increments the counter values by "1" according to a number (i) of an arithmetic processor from an SPU allocating unit 312. For example, when the number of the arithmetic processor is "0", the counter control unit 330 initializes the counter value of the counter 331 to "0" and increments the counter values of the counters 332 and 333 by "1". When the counter control unit 330 receives a start signal for the face detection processing for a new generated reduced image from the SPU allocating unit 312, the counter control unit 330 initializes the counter values of the counters 331 to 333 to "0".

The counters 331 to 333 are counters corresponding to the arithmetic processor (SPU#0) 410 to (SPU#2) 430. The counters 331 to 333 change the counter values on the basis of an instruction from the counter control-unit 330. The counters 331 to 333 output the counter values thereof to the selector 340.

The selector 340 selects one counter among the counters 331 to 333 according to the number (i) of the arithmetic processor from the SPU allocating unit 312 and supplies a counter value of the counter to the transfer-image-width calculating unit 354. For example, when the number of the arithmetic processor from the SPU allocating unit 312 is "0", the selector 340 supplies the counter value of the counter 331 to the transfer-image-width calculating unit 354. The selector 340 is an example of a selector described in claims.

The transfer-image-width calculating unit 354 calculates transfer image width on the basis of the counter value supplied from the selector 340. Specifically, the transfer-image-width calculating unit 354 outputs a value obtained by adding 1 to the supplied counter value and multiplying the counter value, to which 1 is added, with 2 as transfer image width. The calculation of the transfer image width can be represented by the following formula:

transfer image width=(1+counter value)×moving steps of face detection area

The counter value increases by "1" at a time until being allocated by the SPU allocating unit 312. The counter value indicates the number of times, in a period from the last allocation to the present allocation to one arithmetic processor, the face detection processing is allocated to the other arithmetic processors. In other words, the number of times the order of processing is skipped is stored as the counter value. In this example, the face detection area moves to the right by two pixels every time the face detection processing is allocated. Therefore, transfer image width=(1+counter value)×2.

The transfer-image-width calculating unit 354 is an example of a transfer-image-size calculating unit described in claims.

The selector 360 selects any one of the transfer-image-width storing unit 351 and the transfer-image-width calculating unit 354 on the basis of the number of times of allocation from the SPU allocating unit 310 and outputs transfer image width to the transmitting unit 212.

FIG. 15 is a diagram of a transition example of a counter value of the transfer-image allocating unit 300 in the third example of the face detecting apparatus 100 according to this embodiment. It is assumed that the face detection processing is allocated to the arithmetic processors (SPU#0) 410 to (SPU#2) 430 in the order shown in FIGS. 10A to 10I. In FIG. 15, a corresponding relation between the order of allocation of the face detection processing by the control processor 200 and the counter values of the counters 331 and 333 is shown in FIG. 15. In counters 641 to 643, the counter values of the counters 331 to 333 are shown, respectively. In processing sequential orders 651 to 659, processing order of allocation of the face detection processing by the control processor 200 is shown. The order corresponds to FIGS. 10A to 10I.

The counters with the counter value "0" in the processing sequential orders 651 to 659 mean that the detection processing is allocated to the arithmetic processor (SPU#0) corresponding to the counters by the control processor 200. For example, in the processing sequential orders 651, the counter 641 corresponding to the arithmetic processor (SPU#0) indicates "0". This means that the face detection processing is allocated to the arithmetic processor (SPU#0) 410.

In the counters 641 to 643, the counter values of the counters 641 to 643 increase by "1" every time the processing sequential order increases by 1 until the face detection processing is allocated to the arithmetic processors corresponding to the counters. For example, the counter value of the counter 641 increases by "1" at a time in the processing sequential orders 655 to 657.

The calculation of transfer image width using the counter values of the counters 641 to 643 is briefly explained. For example, in the processing sequential order 658, first, the arithmetic processor (SPU#0) 410 corresponding to the counter 641 is allocated. A counter value of the counter 331 at this point is "3" shown in the processing sequential order 657. The counter value "3" is output from the selector 340. After adding 1 allocated this time to this counter value, the counter value added with 1 is multiplied with 2, which is moving steps of the face detection area, whereby "8" (=(1+3)×2) is output as transfer image width.

In this way, the counters corresponding to the arithmetic processors are provided and the counter value is incremented by "1" every time the face detection processing is allocated. This makes it possible to manage how many times the order of processing is skipped in the arithmetic processor. The transfer image width is calculated on the basis of the number of times the order is skipped. This makes it possible to prevent the loss of transfer image area data and transfer the transfer image area data without overlapping the transfer image area data already stored in the local image memory 530.

Figure 16A:
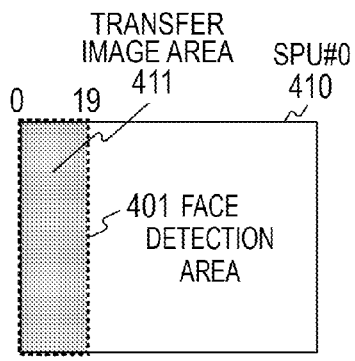
FIGS. 16A to 16I are conceptual diagrams of a processing method of the face detecting apparatus 100 in the third example of the face detecting apparatus 100 according to the embodiment.
Figure 16B:
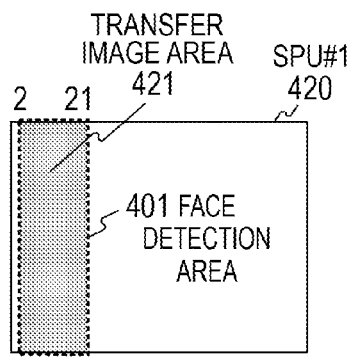
Figure 16C:
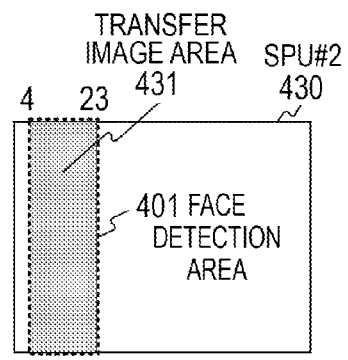
Figure 16D:
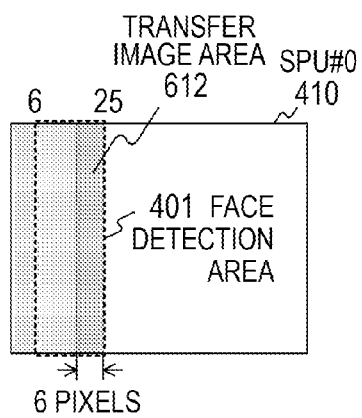
Figure 16E:
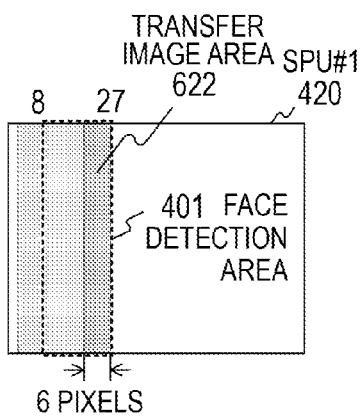
Figure 16F:
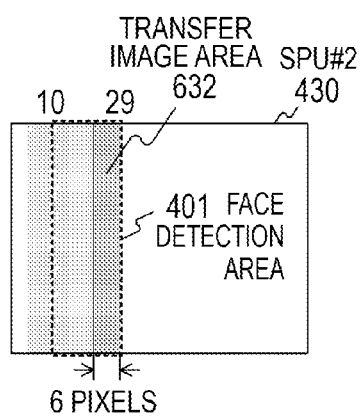

FIGS. 16A to 16I are conceptual diagrams of a processing method in the third example of the face detecting apparatus 100 according to this embodiment. In this example, for convenience of explanation, the face detection processing by the three arithmetic processors (SPU#0) 410 to (SPU#2) 430 is assumed. It is assumed that the control processor 200 allocates the face detection processing in order of FIGS. 16A to 16I. Since FIGS. 16A to 16C are the same as FIGS. 4A to 4C, explanation of the figures is omitted.

Figure 16H:
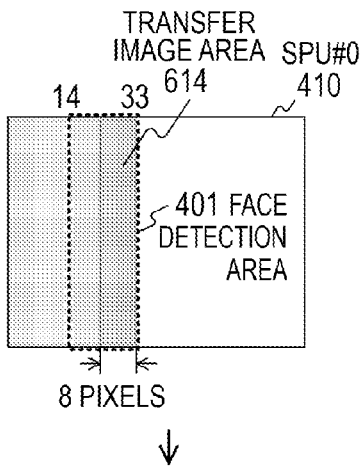
Figure 16G:
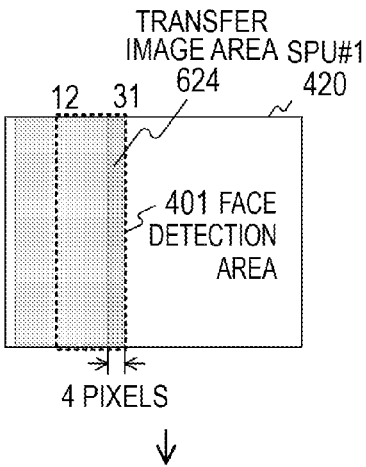
Figure 16I:
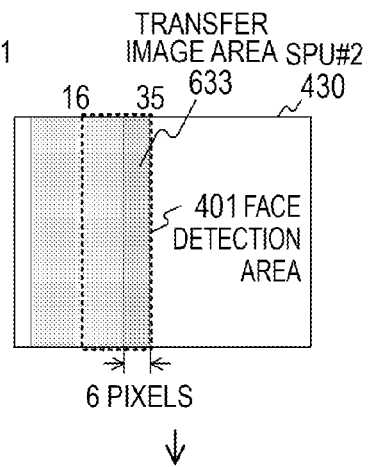

In FIGS. 16G and 16H, the control processor 200 interchanges sequential orders allocated to the arithmetic processor (SPU#1) 420 and the arithmetic processor (SPU#0) 410. In this case, in FIG. 16H, as explained with reference to FIG. 15, transfer image width is calculated according to a counter value. Therefore, the transfer image area 614 having 8-pixel width is transferred without overlapping the existing transfer image area. In FIG. 16G, the transfer image area 624 having the width of 4 (=(1+1)×2) pixels calculated as shown in FIG. 15 is transferred without overlapping the existing transfer image area.

Figure 17:
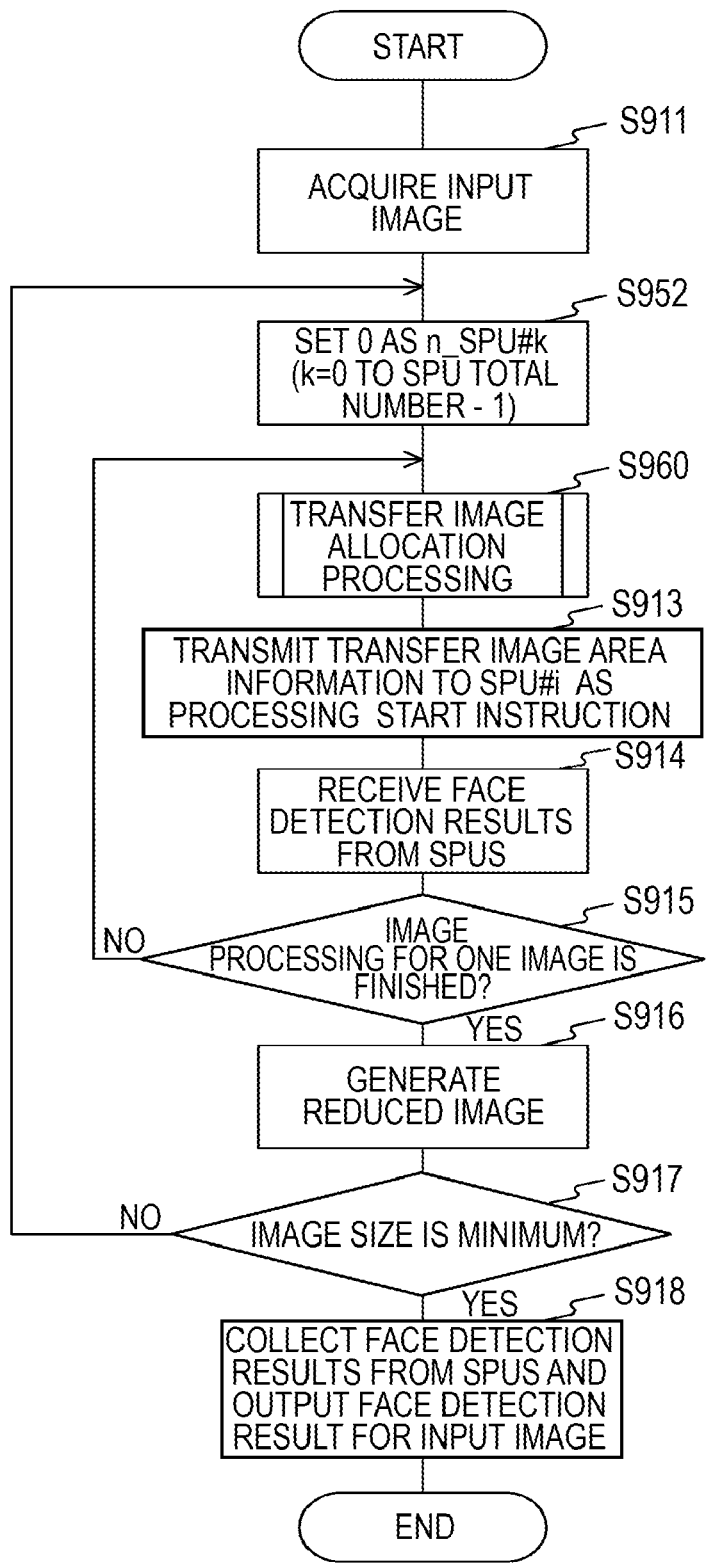
FIG. 17 is a flowchart of a processing procedure example of a face detection processing control method of the control processor 200 in the third example of the face detecting apparatus 100 according to the embodiment.
Figure 19A:
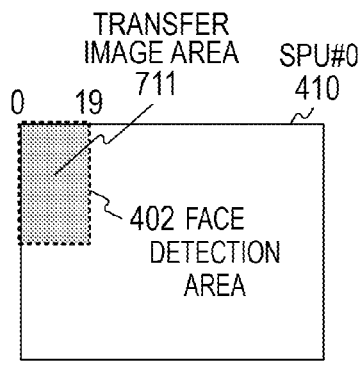
FIGS. 19A to 19I are conceptual diagrams of a processing method in a fourth example of the face detecting apparatus 100 according to the embodiment.
Figure 19B:
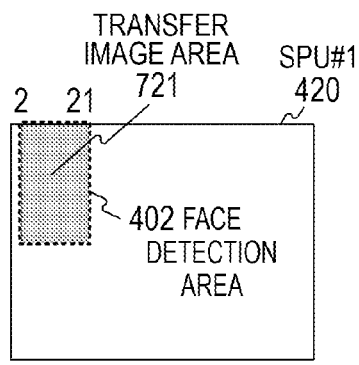
Figure 19C:
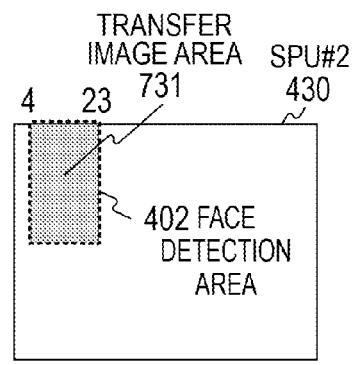
Figure 19D:
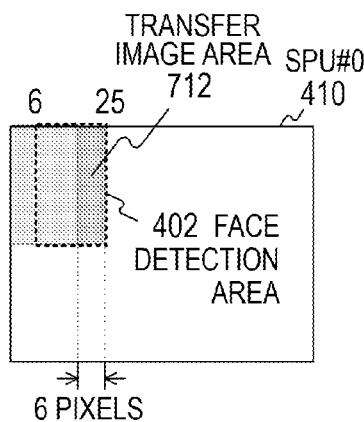
Figure 19E:
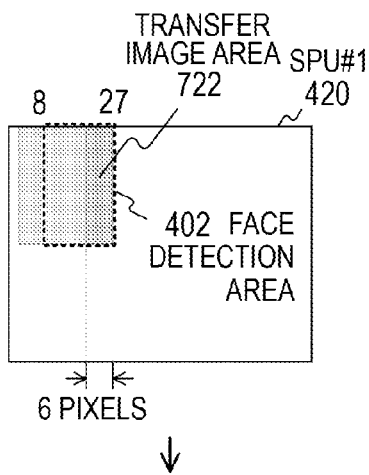
Figure 19F:
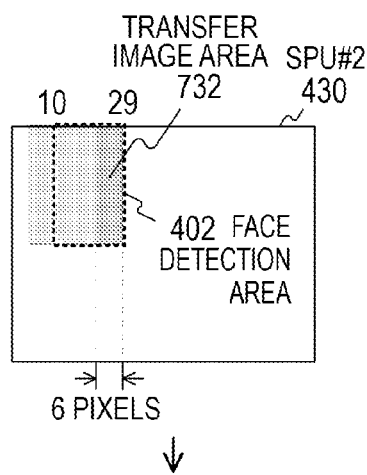
Figure 19G:
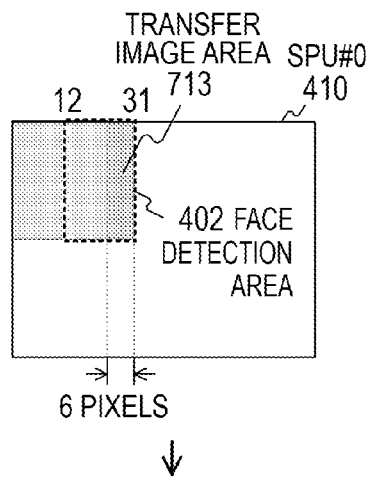
Figure 19H:
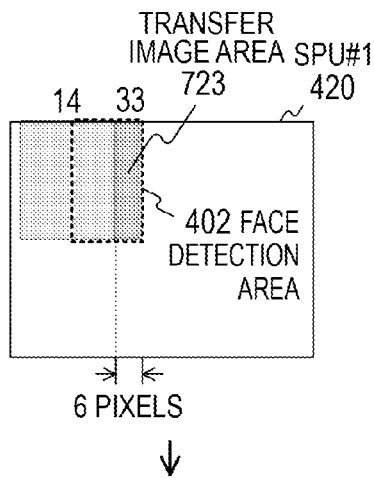
Figure 19I:
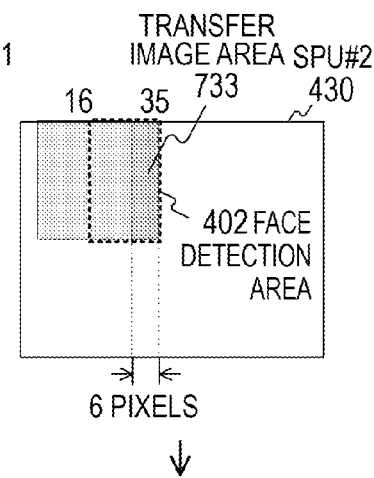
Figure 20A:
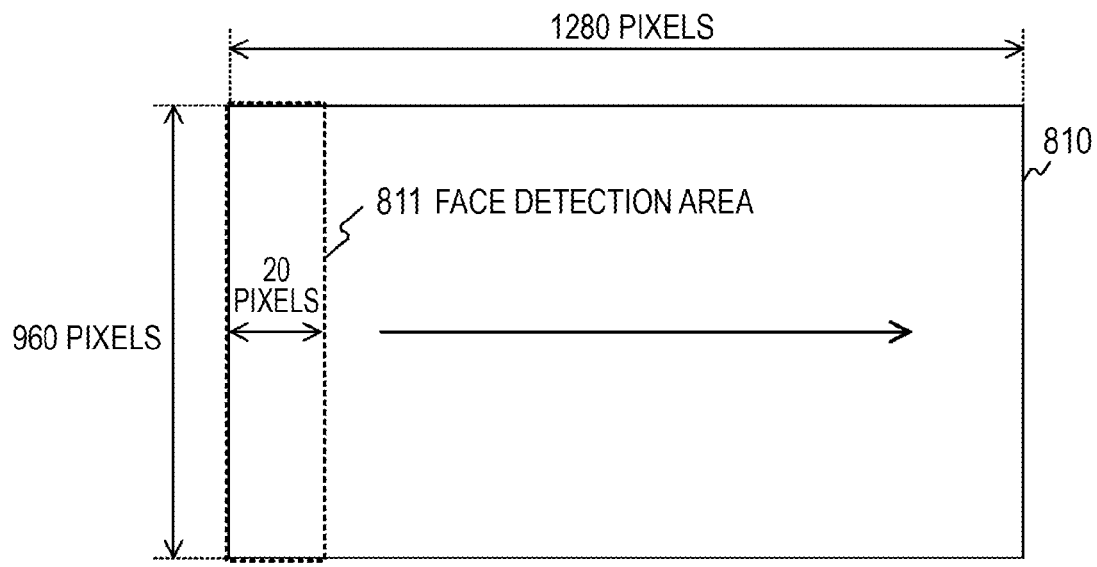
FIGS. 20A to 20C are schematic diagrams of a method of face detection processing.
Figure 20B:
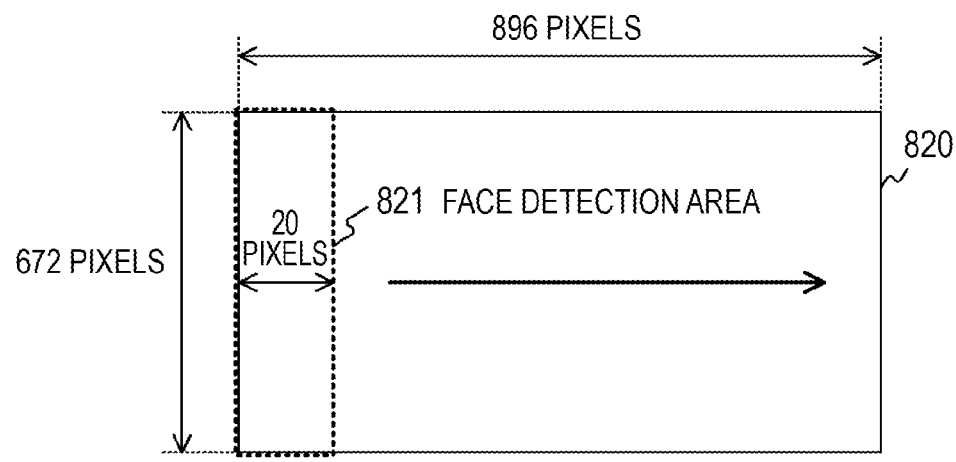
Figure 20C:
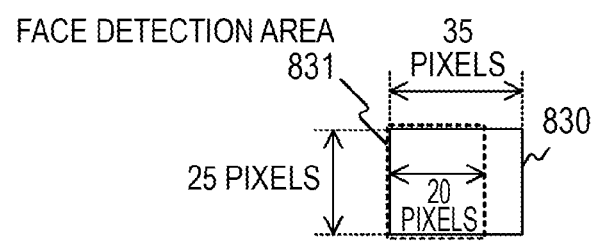

FIG. 17 is a flowchart of a processing procedure example of a face detection processing control method of the control processor 200 in the third example of the face detecting apparatus 100 according to this embodiment.

First, the control processor 200 acquires, using the transfer-image allocating unit 300, a start point address, the height, and the width of an input image on the image memory 120 (step S911). Subsequently, the control processor 200 causes the counter control unit 330 to set counter values of the counters corresponding to the arithmetic processors to initial values (step S952). The control processor 200 executes, using the transfer-image allocating unit 300, transfer image processing on the basis of the start point address, the height, and the width of the input image (step S960). The control processor 200 transmits transfer image area information to the arithmetic processor (SPU#i), to which the face detection processing is allocated, as a processing start instruction (step S913). The control processor 200 receives end notification from the arithmetic processors (step S914). The control processor 200 determines, using the transfer-image allocating unit 300, whether the face detection processing for one input image or reduced image is finished (step S915). When the face detection processing for one input image or reduced image is not finished, the control processor 200 returns to step S960.

On the other hand, when the face detection processing for one input image or reduced image is finished, the control processor 200 generates, using the reduced-image generating unit 220, a reduced image at a predetermined reduction ratio and stores the reduced image in the image memory 120 (step S916) The control processor 200 determines whether the reduced image is smaller than predetermined size (step S917). When the reduced image is larger than the predetermined size, the control processor 200 returns to step S952 and causes the counter control unit 330 to set the counter values of the counters corresponding to the arithmetic processor to the initial values.

On the other hand, when the reduced image is smaller than the predetermined size, the control processor 200 calculates a final face detection result concerning the input image on the basis of a face detection result concerning an input image and plural reduced images received from each of the arithmetic processors (SPU) 400 (step S918).

FIG. 18 is a flowchart of a processing procedure example of the transfer image allocation processing (step S960) of the control processor 200 in the third example of the face detecting apparatus 100 according to this embodiment.

First, the control processor 200 allocates, using the SPU allocating unit 312, the face detection processing to the arithmetic processor (SPU#i) 400 (step S961). Step S961 is an example of the detection processing allocation procedure described in claims. Subsequently, the control processor 200 outputs transfer image height using the SPU allocating unit 312 (step S962). The control processor 200 determines whether the arithmetic processor (SPU#i) 400 performs first face detection processing (step S963). In the case of the first face detection processing, the control processor 200 sets an initial value "20" as the transfer image width (step S969). On the other hand, in the case of second or subsequent face detection processing, the control processor 200 sets a numerical value obtained by adding 1 to a counter value of a counter corresponding to the arithmetic processor (SPU#i) and multiplying the counter value, to which 1 is added, with 2 as the transfer image width (step S964). Step S964 is an example of the size generation procedure described in claims.

The control processor 200 adds 2 to an end point address using the end-address output unit 371 (step S965). The control processor 200 outputs, using the start-point-address output unit 372, a start point address obtained by adding 1 to the end point address and reducing the transfer image width from the end point address (step S966). Steps S965 and S966 are an example of the reference position generation procedure described in claims.

The control processor 200 initializes, using the counter control unit 330, the counter value of the counter corresponding to the arithmetic processor (SPU#i) 400, to which the face detection processing is allocated, to "0" (step S967). At the same time the control processor 200 increments counter values of counters corresponding to the other arithmetic processors by "1" (step S968).

As explained above, in the third example in this embodiment, the counters corresponding to the arithmetic processors are provided and transfer image width is calculated according to counter values of the counters. This makes it possible to efficiently transfer the transfer image area data to the local image memory without causing the loss of the transfer image area data.

FIGS. 19A to 19I are conceptual diagrams of a processing method in a fourth example of the face detecting apparatus 100 according to this embodiment. In this example, for convenience of explanation, the face detection processing by the three arithmetic processors (SPU#0) 410 to (SPU#2) 430 is assumed. It is assumed that the control processor 200 allocates the face detection processing in order of FIGS. 19A to 19I. In FIGS. 19A to 19I, the height of a face detection area 402 and the height of transfer image areas 711 to 713, 721 to 723, and 731 to 733 are set to a half of the height of an input image or a reduced image. The processing method other than the setting of the height of the face detection area 402 is the same as that in the other examples. Therefore, explanation of the processing method is omitted.

In this way, in this embodiment, the height of the face detection area 402 may be set to a half of the height of the input image or the reduced image. The height of the face detection area 402 is set to a half of the height of the input image or the reduced image as an example. However, the height of the face detection area 402 is not limited to this example and may be set to the height of a template image.

When there is an arithmetic processor that takes long time for processing among the plural arithmetic processors 400, it is also possible to redistribute unprocessed data of the arithmetic processor, which takes longtime for the processing, to another arithmetic processor that has already finished processing and cause the other arithmetic processor to process the unprocessed data.

As explained above, according to this embodiment, it is possible to improve the processing speed by performing the face detection processing using the plural arithmetic processors 400. It is also possible to reduce a data amount of a transfer image area transferred to the local image memory 530 of the arithmetic processor 400 and more efficiently perform the face detection processing by moving the face detection area in a fixed direction little by little.

In this embodiment, the face detecting apparatus is explained as an example. However, this embodiment can be applied to an object detecting apparatus or the like that detects an object other than a face by providing an object detecting unit instead of the configuration for detecting a face in the face detecting unit 540.

This embodiment indicates an example for embodying the present invention and has a corresponding relation with each of the invention specifying matters in claims as explained above. However, the present invention is not limited to the embodiment. Various modifications can be applied to the embodiment without departing from the spirit of the present invention.

The processing procedures explained in this embodiment may be grasped as a method having the series of procedures. The processing procedures may also be grasped as a computer program for causing a computer to execute the series of procedures or a recording medium that stores the computer program. As the recording medium, for example, a CD (Compact Disc), an MD (Mini Disc), a DVD (Digital Versatile Disk), a memory card, and a Blu-ray disc (registered trademark) can be used.

The present application contains subject matter related to that disclosed in Japanese Priority Patent Application JP 2008-169251 filed in the Japan Patent Office on Jun. 27, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An object detection control apparatus to control a plurality of object detecting units to perform an object detection processing on an image, the object detection control apparatus comprising:
    at least one processor; and
    at least one recording medium having encoded thereon executable instructions that, when executed by the at least one processor, cause the at least one processor to execute a method, the method comprising:
        selecting a selected object detecting unit of a plurality of object detecting units to which to allocate the object detection processing, each object detecting unit of the plurality of object detecting units being configured to perform the object detection processing on image data of a transfer image area, the image data of the transfer image area being image data that is at least a portion of the image and that is to be made available to the selected object detecting unit for the selected object detecting unit to perform the object detection processing;
        generating a size of the transfer image area based at least in part on a detection area for the selected object detecting unit to which the detection processing is allocated, the detection area identifying an area of the image on which the selected object detecting unit is to perform the object detection process, the area being at least a portion of the image; and
        generating a first position, indicating a first pixel address of the image and serving as a reference for the transfer image area, based at least in part on the size of the transfer image area and generating a second position indicating a second pixel address of the image and serving as a reference for the detection area of the selected object detecting unit.

2. The object detection control apparatus according to claim 1, wherein:
    the method further comprises iteratively allocating the object detection processing to object detecting units of the plurality of object detecting units over time, the iterative allocating comprising allocating the object detection processing to a first object detecting unit and allocating the objection detection processing a number of times to other object detecting units prior to again allocating the object detection processing to the first object detecting unit;
    the generating comprises generating the size of the transfer image area based at least in part on the number of times the object detection processing is allocated to the other object detecting units.

3. The object detection control apparatus according to claim 2, wherein generating the size based at least in part on the number of times the object detection processing is allocated comprises calculating a numerical value based on a number of the plurality of object detecting units and a number of pixels that the detection area is moved when the object detection processing is allocated to an object detecting unit.

4. The object detection control apparatus according to claim 2, wherein generating the size based at least in part on the number of times the detection processing is allocated comprises estimating a value in advance.

5. The object detection control apparatus according to claim 2, wherein
    a plurality of counters correspond to respective object detecting units of the plurality of object detecting units;
    the method further comprises:
        outputting, when the object detection processing is allocated to the selected object detecting unit, a counter value of the counter corresponding to the selected object detecting unit;
        setting, when the object detection processing is allocated to the selected object detecting unit, the counter corresponding to the selected object detecting unit to an initial value and incrementing other counters of the plurality of counters by a fixed number; and
        outputting, as the size of the transfer image area, a numerical value calculated based on the counter value of the counter corresponding to the selected object detecting unit and a number of pixels that the detection area is moved when the object detection processing is allocated to an object detecting unit.

6. The object detection control apparatus according to claim 1, wherein the method further comprises allocating the object detection processing to a next selected object detecting unit in response to receiving an end notification of the object detection processing from the selected object detecting unit.

7. The object detection control apparatus according to claim 1, wherein selecting a selected object detecting unit of the plurality of object detecting units to which to allocate the object detection processing comprises iteratively selecting each of the plurality of object detecting units according to an order.

8. The object detection control apparatus according to claim 1, wherein generating the size of the transfer image area based at least in part on the detection area comprises generating the size of the transfer image area based at least in part on whether the object detection processing has been previously allocated to the selected object detecting unit.

9. The object detection control apparatus according to claim 8, wherein:
    the method further comprises:

determining whether the object detection processing for processing at least a portion of the input image was previously allocated to the selected object detecting unit; and generating the size of the transfer image area based at least in part on the detection area further comprises:

in response to determining that the object detection processing was previously allocated to the selected object detecting unit, generating the size of the transfer image area based at least in part on a previously-determined size of a previously-determined transfer image area determined for the selected object detecting unit.

10. The object detection control apparatus according to claim 9, wherein, when the object detection processing was previously allocated to the selected object detecting unit, image data included in the detection area to be processed by the selected object detecting unit comprises a portion of first image data of the previously-determined transfer image area and the image data of the transfer image area.

11. The object detection control apparatus according to claim 9, wherein generating the size of the transfer image area based at least in part on the detection area further comprises:

in response to determining that the object detection processing was not previously allocated to the selected object detecting unit, generating the size of the transfer image area based on the size of the detection area.

12. The object detection control apparatus according to claim 1, wherein the method further comprises:

producing the image on which the object detection processing is to be performed by generating a reduced image from an input image.

13. The object detection control apparatus according to claim 12, wherein the method further comprises:

following performance of the object detection processing on the image, producing a second image on which to perform the object detection processing by generating a second reduced image from the image; and performing the selecting of the selected object detecting unit, the generating of the size, and the generating of the first position and the second position for the second image.

14. An object detecting system to perform object detection processing on an image, the object detecting system comprising:

a plurality of object-detection processing apparatuses that perform the object detection processing, each object-detection processing apparatus of the plurality of object-detection processing apparatuses being configured to perform the object detection processing on image data of a transfer image area, the image data of the transfer image area being image data that is at least a portion of the image and that is to be made available to the object-detection processing apparatus to perform the object detection processing; and an object-detection control apparatus configured to:

select a selected object-detection processing apparatus of the plurality of object-detection processing apparatuses to which to allocate the object detection processing, generating a size of the transfer image area based at least in part on a detection area for the selected object detecting unit to which the object detection processing is allocated, the detection area identifying an area of the image on which the selected object detecting unit is to perform the object detection process, the area being at least a portion of the image, and calculating a first position, indicating a first pixel address of the image and serving as a reference of the transfer image area, based at least in part on the size of the transfer image area and calculating a second position indicating a second pixel address of the image and serving as a reference for the detection area for the selected object-detection apparatus.

15. An object detection control method for controlling a plurality of object detecting units to perform an object detection processing on an image, the method comprising:

allocating object detection processing to a selected object detecting unit of a plurality of object detecting units that are configured to perform the object detection processing on image data of a transfer image area, the image data of the transfer image area being image data that is at least a portion of the image and that is to be made available to the selected object detecting unit for the selected object detecting unit to perform the object detection processing;

generating a size of the transfer image area based at least in part on a detection area for the selected object detecting unit to which the object detection processing is allocated, the detection area identifying an area of the image on which the selected object detecting unit is to perform the object detection process, the area being at least a portion of the image; and generating a first position, indicating a first pixel address of the image and serving as a reference for the transfer image area, based at least in part on the size of the transfer image area and generating a second position indicating a second pixel address of the image and serving as a reference for the detection area for the selected object detecting unit.

16. At least one recording medium having encoded thereon executable instructions that, when executed by at least one computer, cause the at least one computer to perform a method, the method comprising:

allocating object detection processing to a selected object detecting unit of a plurality of object detecting units that are configured to perform the object detection processing on image data of a transfer image area, the image data of the transfer image area being image data that is at least a portion of the image and that is to be made available to the selected object detecting unit for the selected object detecting unit to perform the object detection processing;

generating a size of the transfer image area based at least in part on a detection area for the selected object detecting unit to which the object detection processing is allocated, the detection area identifying an area of the image on which the selected object detecting unit is to perform the object detection process, the area being at least a portion of the image; and generating a first position, indicating a first pixel address of the image and serving as a reference for the transfer image area, based at least in part on the size of the transfer image area and generating a second position indicating a second pixel address of the image and serving as a reference for the detection area for the selected object detecting unit.

* * * * *